(12) United States Patent
Schäferling et al.

(10) Patent No.: US 12,556,829 B2
(45) Date of Patent: Feb. 17, 2026

(54) HOUSEHOLD APPLIANCE WITH CAMERA MODULE, METHOD FOR RELEASING AN INTERMEDIATE WALL AND METHOD FOR FASTENING A CAMERA MODULE TO AN INTERNAL WALL

(71) Applicant: BSH Hausgeräte GmbH, Munich (DE)

(72) Inventors: Joachim Schäferling, Bissingen (DE); Christopher Rodney, Villenbach (DE); Stephan Kempfle, Ellzee (DE); Daniel Bihr, Kirchheim am Ries (DE)

(73) Assignee: BSH Hausgeräte GmbH, Munich (DE)

( * ) Notice: Subject to any disclaimer, the term of this patent is extended or adjusted under 35 U.S.C. 154(b) by 330 days.

(21) Appl. No.: 18/353,532

(22) Filed: Jul. 17, 2023

(65) Prior Publication Data

US 2024/0031689 A1    Jan. 25, 2024

(30) Foreign Application Priority Data

Jul. 19, 2022   (DE) ..................... 10 2022 207 375.4
Jul. 19, 2022   (DE) ..................... 10 2022 207 376.2
Jul. 19, 2022   (DE) ..................... 10 2022 207 377.0

(51) Int. Cl.
*H04N 23/90*      (2023.01)
*F25D 23/06*      (2006.01)
(Continued)

(52) U.S. Cl.
CPC ........... *H04N 23/90* (2023.01); *F25D 23/063* (2013.01); *F25D 29/005* (2013.01); *G03B 29/00* (2013.01);
(Continued)

(58) Field of Classification Search
CPC .... F25D 23/063; F25D 23/065; F25D 23/066; F25D 29/00; F25D 29/005;
(Continued)

(56) References Cited

U.S. PATENT DOCUMENTS 9,851,139 B2    12/2017   Kim et al.
10,429,032 B2 *  10/2019   Choi .......................... F21V 7/06
(Continued)

FOREIGN PATENT DOCUMENTS

DE      102009000667 A1 *   8/2010   ........... F25D 23/065
DE      102009002330 A1 *  10/2010   .............. F16B 5/065
(Continued)

*Primary Examiner* — Andrew Roersma
(74) *Attorney, Agent, or Firm* — Laurence A. Greenberg; Werner H. Stemer; Ralph E. Locher

(57) ABSTRACT

A household appliance, in particular a refrigerator, includes a storage compartment defined by an internal wall having a loading opening being closable by at least one door. A camera module is disposed on a ceiling of the internal wall. A particularly simple assembly and disassembly of camera modules in a household appliance is provided. A compact arrangement of camera modules in a household appliance is also provided. Images which are particularly well-suited for identifying items to be stored that are deposited in the household appliance, are to be recorded by the camera modules. A method for releasing an intermediate wall and a method for fastening a camera module to an internal wall are also provided.

33 Claims, 16 Drawing Sheets

(51) Int. Cl.
*F25D 29/00* (2006.01)
*G03B 29/00* (2021.01)
*H04N 23/51* (2023.01)
*H04N 23/57* (2023.01)

(52) U.S. Cl.
CPC ............. *H04N 23/51* (2023.01); *H04N 23/57* (2023.01); *F25D 2700/00* (2013.01)

(58) Field of Classification Search
CPC . F25D 2500/06; F25D 2700/06; H04N 23/51; H04N 23/57; H04N 23/90; G03B 29/00
See application file for complete search history.

(56) References Cited

U.S. PATENT DOCUMENTS

| | | | |
|---|---|---|---|
| 2010/0220460 A1* | 9/2010 | Hall | F25D 27/00 362/92 |
| 2013/0120966 A1* | 5/2013 | Kempfle | F21V 23/06 362/92 |
| 2013/0207527 A1* | 8/2013 | Heinrich | H05K 5/03 312/223.1 |
| 2017/0039511 A1* | 2/2017 | Corona | F25D 29/00 |
| 2018/0172336 A1* | 6/2018 | Bae | F25D 17/062 |
| 2018/0187945 A1* | 7/2018 | Jung | F25D 23/066 |
| 2022/0397338 A1* | 12/2022 | Ryu | F25D 29/005 |
| 2024/0318900 A1* | 9/2024 | Kang | F25D 23/066 |
| 2024/0337435 A1* | 10/2024 | Hwang | F21V 23/001 |

FOREIGN PATENT DOCUMENTS

| | | | | |
|---|---|---|---|---|
| DE | 102013216759 A1 | * | 2/2015 | ............ G03B 17/08 |
| JP | 2018124053 A | * | 8/2018 | |
| JP | 2021188831 A | * | 12/2021 | ............ F25D 27/00 |
| KR | 101104177 B1 | * | 1/2012 | ............ F25D 27/00 |
| KR | 101192114 B1 | * | 10/2012 | ........... F25D 23/065 |
| KR | 1020220030128 A | * | 3/2022 | |
| WO | WO-2017036782 A1 | * | 3/2017 | ............ G03B 17/00 |
| WO | WO-2020193748 A1 | * | 10/2020 | ........... C12Q 1/6886 |
| WO | WO-2023224272 A1 | * | 11/2023 | ........... F25D 29/005 |

* cited by examiner

HOUSEHOLD APPLIANCE WITH CAMERA MODULE, METHOD FOR RELEASING AN INTERMEDIATE WALL AND METHOD FOR FASTENING A CAMERA MODULE TO AN INTERNAL WALL

CROSS-REFERENCE TO RELATED APPLICATION

This application claims the priority, under 35 U.S.C. § 119, of German Patent Applications:
DE 10 2022 207 375.4, filed Jul. 19, 2022,
DE 10 2022 207 377.0, filed Jul. 19, 2022,
DE 10 2022 207 376.2, filed Jul. 19, 2022;
the prior applications are herewith incorporated by reference in their entirety.

FIELD AND BACKGROUND OF THE INVENTION

The invention relates to a household appliance having a storage compartment defined by an internal wall, the storage compartment having a loading opening being closable by at least one door, and at least one camera module being disposed on a ceiling of the internal wall. The invention is advantageously applicable, in particular, to refrigerators, in particular refrigerators with a double door, specifically in a French door arrangement. The invention also relates to a method for releasing an intermediate wall and a method for fastening a camera module to an internal wall.

DESCRIPTION OF THE RELATED ART

U.S. Pat. No. 9,851,139 B2 discloses a refrigerator having: a refrigerating zone which is provided with a loading opening in a front surface thereof, an upper wall, a lower wall, side walls and a rear wall, wherein the storage compartment is provided with a shelf region, which is subdivided by a plurality of storage compartments, and with a drawer region having at least one drawer, wherein the upper wall, the lower wall, the side walls and the rear wall are formed of an insulating material; at least one door in order to open and to close the storage compartment; and a camera system including: a camera module, including an image sensor, a camera lens, electrical components, which are configured for activating the image sensor, and a transparent window which is spaced apart at a predetermined distance from the camera lens; and a camera housing which is configured to receive and to fasten the camera module at a predetermined position in the camera housing, wherein the camera housing includes: a fastening surface which is disposed in such a way that it adjoins an upper wall of the refrigerator compartment; a front surface which is disposed in such a way that it opposes the loading opening, and side surfaces which connect the front surface to a rear surface of the camera housing; and an upper surface which is provided with an opening which makes it possible for the transparent window of the camera module to be exposed thereby. The camera module is placed with the fastening surface against the upper wall of the refrigerator compartment and held there by a backing piece. The backing piece is held by being encapsulated by injection-molding by a thermally insulating and hardening insulating foam.

SUMMARY OF THE INVENTION

It is accordingly an object of the invention to provide a household appliance with a camera module, a method for releasing an intermediate wall and a method for fastening a camera module to an internal wall, which at least partially overcome the hereinafore-mentioned disadvantages of the heretofore-known appliances and methods of this general type, which, in particular, provide a possibility for a compact arrangement of camera modules in a household appliance, and with which images which are particularly well-suited for identifying items to be stored which are deposited in the household appliance, are able to be recorded thereby.

It is also an object of the present invention to provide a possibility for the particularly simple assembly and disassembly of camera modules in a household appliance.

These objects are achieved according to the features of the independent claims. Preferred embodiments can be found, in particular, in the dependent claims and/or the description.

With the foregoing and other objects in view there is provided, in accordance with one aspect of the invention, a household appliance having a storage compartment defined by an internal wall, the loading opening thereof being closable by at least one door, wherein at least two camera modules are disposed directly one behind the other on a ceiling of the internal wall in a front view.

The arrangement of the camera modules on the ceiling side has the advantage that images of items to be stored which are deposited on a door inner face and/or items to be stored which are located in an extended drawer can be recorded with a particularly good overview. The arrangement directly one behind the other provides the advantage of a compact arrangement and also that the fields of view of the camera modules can be brought into congruence in a particularly simple manner, which can be advantageous for example in order to generate composite or "stitched" images.

The household appliance can be, for example, a refrigerator, a freezer or a combination thereof. The storage compartment or the loading opening thereof can be closed by one or more doors. The inner face(s) of the door(s) is/are configured, for example, with bottle racks, an egg rack, butter compartments, etc., in particular for depositing items to be stored.

The present invention is particularly advantageously applicable to a household appliance, in particular a refrigerator, having two doors in a so-called "French door" double-door arrangement, i.e. an arrangement in which two doors or door leaves are attached on opposing sides and close the same storage compartment. This is because the arrangement of the camera modules one behind the other specifically also advantageously permits in this case the provision of a particularly large amount of space to the left and right thereof for lighting elements which separately illuminate a corresponding left-hand or right-hand storage compartment side. This is particularly advantageous if only one of the two doors or door leaves is open.

The storage compartment is provided to receive items to be stored, in particular for refrigeration. The storage compartment can have one or more shelves. The storage compartment can have one or more drawers, in particular special air-conditioned drawers, for example a VitaFresh drawer (which keeps fresh foods in better condition for a longer time by permitting the temperature and humidity inside to be changed by the user).

The usable storage compartment is defined on the left-hand side, right-hand side, rear side, bottom side and ceiling side by the internal wall. The internal wall can be formed of metal, plastic or a combination thereof, for example plastic-coated sheet metal.

The ceiling of the internal wall is also denoted hereinafter as the "storage compartment ceiling." The internal container can also be denoted as the "inner liner." The internal wall of the at least one door facing the storage compartment, typically a plastic part, can also be assigned to the inner liner.

The at least two camera modules can include two or more camera modules.

The camera module can have, for example, an image sensor or camera sensor, an electronics module (for example for activating the camera sensor, for data transmission, etc.), optionally an optical system (for example a camera lens) connected upstream of the camera sensor, optionally a flash light and optionally further functional units. A module housing is configured to fasten at least the camera sensor to the ceiling.

It is one development that, apart from their module housing, the camera modules have the same parts, such as for example the same camera sensor, the same electronics module, etc.

A "front view" is understood to mean, in particular, a view relative to the household appliance from front to back. This can also be expressed in such a way that the front view corresponds to a view in the depth direction of the storage compartment. A front view can also be understood to mean a view from the outside through the loading opening perpendicular to the plane of the loading opening.

The at least two camera modules being disposed "directly one behind the other" in a front view can encompass, in particular, that these camera modules are disposed in a line one behind the other or from front to back in a front view, and thus are not, or at least not noticeably, laterally offset to one another in a front view. In particular, to this end the central points of the camera modules can be disposed in a line one behind the other. In principle, the spacing of the camera modules disposed one behind the other is not limited relative to one another in the viewing direction or depth direction. However, for a compact arrangement it is advantageous if the camera modules are disposed at a short distance or immediately one behind the other (for example separated by a narrow web).

It is one embodiment that the camera modules are disposed directly one behind the other, by the two camera modules being located in a vertical plane which is perpendicular to the loading opening.

It is one embodiment that the optical axes of the camera modules, in particular the optical systems thereof, are located in the vertical plane which is perpendicular to the loading opening in which the camera modules are disposed.

It is one embodiment that the optical axis of a first camera module is at a smaller angle relative to the horizontal (i.e. runs flatter) than an optical axis of a second camera module. Thus the advantage is achieved—for example in contrast to a camera with fisheye lens—that different vertical regions of the household appliance can be depicted by different camera modules in a manner which is particularly sharp and with high resolution.

It is one embodiment that at least one extendable drawer can be accommodated in the storage compartment, a field of view of the first camera module encompasses the loading opening and a field of view of a second camera module encompasses at least one open extendable drawer. Thus the advantage is achieved that it is possible to record by using the first camera module an image from an inner face of the at least one door, on which typically door storage compartments for items to be stored, for example bottles, eggs, butter, etc. are present. Advantageously an image from above of the at least one open drawer can be recorded by using the second camera module.

It is one development that the at least one extendable drawer includes exactly one extendable drawer. It is one development that the at least one extendable drawer includes at least two extendable drawers. Two extendable drawers can be disposed one on top of the other or adjacent to one another.

It is one development that a field of view of the first camera module encompasses an inner face of the at least one door. The entire loading opening or only a part of the loading opening can be located in the field of view of the first camera module.

It is one embodiment that the optical axis of the second camera module is oriented at least approximately vertically downwardly. Thus it is advantageously possible to achieve a particularly clear recording of items to be stored which are present in a drawer. That the optical axis of the second camera module is oriented at least approximately vertically downwardly can encompass, in particular, that it is oriented downwardly within a deviation in a range of 10° to the vertical axis, in particular within a range of 5° to the vertical axis.

It is one embodiment that the first camera module is disposed behind the second camera module. This advantageously permits a particularly large open field of view of the first camera module, since the second camera module needs to be disposed less obliquely than the first camera module and the first camera module can thus "see beyond" the second camera module more easily.

It is one embodiment that, when viewed from the storage compartment, the second camera module is incorporated into the ceiling parallel to the ceiling and the first camera module protrudes downwardly from the storage compartment ceiling. In particular, the optical system of the first camera module can be spaced apart downwardly from the ceiling and, for example, the optical axis thereof oriented obliquely to the front. At the same time, the optical axes of the two camera modules can intersect. This embodiment provides the advantage that the second camera module does not stand in the way of the first camera module and thus images which show particularly clearly and comprehensively items to be stored which are deposited on the inner face(s) of the door(s) can be recorded by using the first camera module. A further advantage is that due to the parallel termination of the second camera module, this second camera module does not get in the way when items to be stored are removed. This also results in a particularly high-quality impression. It is one development that the second camera module is disposed slightly recessed relative to the ceiling, for example between 0.1 and 0.3 mm, in particular ca. 0.2 mm. Alternatively, the second camera module can be incorporated flush-mounted in the ceiling.

It is one embodiment that the camera modules are disposed centrally to the storage compartment in a front view. Thus the advantage is achieved that, due to the fields of view, both lateral halves of the storage compartment and the loading opening can be recorded with the same image quality. This is particularly advantageous in the case of refrigerating zones with a French door arrangement since the storage compartment typically is particularly wide in that case. This also results in a cost saving, since a separate camera module or a separate sensor does not have to be provided for each of the two doors. This is relevant, in particular, if the field of view of the camera sensor is oriented in such a way that it records images in landscape format, optionally with a wide-angle function.

It is one embodiment that the ceiling of the internal wall is at least in some regions a wall or a wall element ("intermediate wall") which is disposed on the storage compartment side spaced apart from a ceiling of an internal container and the intermediate wall is a removable intermediate wall. Thus the advantage is achieved that if a camera module is defective, this camera module is particularly easily accessible for repair or replacement by removing the intermediate wall. The ceiling of the internal container or inner liner is also denoted hereinafter the "container ceiling."

It is one embodiment that the at least two camera modules are disposed on the intermediate wall. This permits a particularly easy accessibility when removing the intermediate wall.

That the storage compartment ceiling is at least in some regions an intermediate wall means, in particular, that the storage compartment ceiling is formed entirely or partially by an intermediate wall. Where the storage compartment ceiling corresponds to the intermediate wall, the intermediate wall is spaced apart below (and thus on the storage compartment side relative to) the container ceiling. Thus an intermediate space is present between the intermediate wall and the container ceiling disposed spaced apart thereabove.

That the intermediate wall is removable encompasses in an advantageous development that the assembled intermediate wall is removable non-destructively, and optionally also without the use of tools. This facilitates, for example, a subsequent reinsertion, for example after one or more camera modules which are located thereon have been repaired, serviced or replaced. In one development, the assembled intermediate wall can also be removed from the internal wall without dismantling the internal container and/or an external housing.

It is one development that the intermediate wall is an intermediate wall which is pivotable into the storage compartment. This facilitates handling of the intermediate wall after the release thereof. That the intermediate wall is pivotable into the storage compartment can encompass, in particular, that for removal it is rotatably positioned on the household appliance with one of its edges (for example—in a front view through the loading opening—with the front-side or front or rear-side or rear edge; hereinafter also denoted as the "pivoting edge") while the other edges are lowered. As a result, the intermediate wall can also be brought out of engagement on the pivoting edge in order to be fully removed or detached from the remaining household appliance.

It is one embodiment that the intermediate wall is an intermediate wall which is pivotable about its front edge. The pivoting edge thus corresponds to the front edge. This has the advantage, amongst other things, that the front edge which is clearly visible to a user has no fastening elements and thereby a particularly unobtrusive impression of the storage compartment ceiling can be produced. It is one development that the intermediate wall can be fastened on its front edge by at least one tab. This permits a particularly simple handling on the front edge when removing and inserting the intermediate wall. It is one development that the part of the household appliance to which the front edge of the intermediate wall can be fastened has at least one tab which can be brought into engagement with a corresponding opening in the intermediate wall. It is one development that the front edge of the intermediate wall can be fastened and has at least one tab which can be brought into engagement with an opposing part of the household appliance. The tab can be a tab which is rectilinear in cross section or a curved tab, in particular curved in a hook-shaped manner. The tab can be bent out of the base body (intermediate wall or opposing part of the household appliance) or can have been retrospectively attached to the base body, for example by welding or TOX clinching. The at least one tab can include exactly one tab or, for advantageously avoiding an oblique position and/or torsion of the intermediate wall, a plurality of tabs, in particular a plurality of tabs disposed adjacent to one another when viewed over the width of the storage compartment.

It is one embodiment that the intermediate wall can be fastened on its rear edge by at least one releasable fastening element, or is fastened in the assembled state. This provides the advantage that the fastening elements are not visible, or only poorly visible, to a user which permits a high-quality impression. The releasable fastening element, in particular, is a fastening element which can be non-destructively inserted and released again, for example a screw, a clamping pin, a rotary pin, etc.

It is one development that in the inserted or assembled state of the intermediate wall the lateral edges (in a front view) are not fastened by a fastening element. This facilitates the removal of the intermediate wall and results in an improved impression. It is another development that in the inserted or assembled state of the intermediate wall the lateral edges are also fastened by at least one fastening element. This results in a particularly stable mechanical fastening of the intermediate wall.

It is one development that the intermediate wall and the container ceiling form one respective partial region of the storage compartment ceiling, the container ceiling (in a front view) is disposed in front of the front edge of the intermediate wall and the intermediate wall can be fastened on its front edge to the container ceiling by the at least one tab. Thus the advantage is achieved of a particularly simple manufacture of the household appliance and a particularly simple assembly and removal of the intermediate wall. That the container ceiling is disposed in front of the front edge of the intermediate wall can encompass in one development that the storage compartment ceiling (in a front view) is divided into or is formed of a front portion which is formed by the container ceiling and a rear portion which is formed by the intermediate wall. In particular, the container ceiling and the intermediate wall substantially extend over the entire width of the storage compartment or the storage compartment ceiling. This is particularly simple in terms of manufacture and permits a particularly extensive configuration of the intermediate wall. In a further development, the container ceiling also surrounds the intermediate wall on the left-hand and/or right-hand side. In yet another development, the container ceiling surrounds the intermediate wall on all sides, i.e. also on the rear edge of the intermediate wall, so that in the inserted state the intermediate wall is inserted into a cutout of the container ceiling.

It is one development that the container ceiling extends over an oblique step from a partial region disposed above the intermediate wall to a partial region disposed in front of the intermediate wall, and at least one recess is incorporated in the oblique step for receiving at least one tab of the front edge of the intermediate wall. This advantageously permits, in a manner which can be structurally easily implemented, a simple and accurate positioning of the container ceiling and the front edge of the intermediate wall to one another and also a narrow abutting edge, providing a high-quality impression. It is one development that the container ceiling and the intermediate wall adjoin one another flush, in particular flush-mounted, in the surface of the storage compartment ceiling. It is one development that the front edge of the intermediate wall is an oblique bent-up edge from which the at least one tab is bent out—in particular to the front—and which is configured in accordance with the oblique step of the container ceiling, i.e. in particular has the same oblique position. This provides the advantage that the storage compartment is separated from the intermediate space formed between the intermediate wall and the container ceiling by a narrow and long gap between the oblique portions, which additionally can be easily sealed, for example by inserting a thin insulating layer. It is one development that on the side of the oblique step facing away from the storage compartment an adapter piece is positioned on one respective recess, and the tabs are inserted in respective adapter pieces or positioned thereon. This provides the advantage that the intermediate space between the intermediate wall and the container ceiling is separated from the intermediate space between the container ceiling and the external housing. Thus when the intermediate space between the container ceiling and the external housing is filled with thermally insulating foam it can be advantageously prevented that this foam also passes into the intermediate space between the intermediate wall and the container ceiling. A further advantage is that the adapter piece can be of relatively complex construction with simple manufacture and thereby also permits a more accurate positionability, a more reliable hold and also an avoidance of squeaking noises of the tabs, in particular if the adapter piece is formed of plastic. The tabs in this embodiment are thus not directly inserted into the respective recesses but are inserted into an adapter piece or located thereon. The adapter piece can be inserted in the recess, latched and/or bonded to the step. The adapter piece has, in particular, a protrusion into which the tab can engage or engages in the assembled state.

It is one development that the intermediate wall can be fastened on its rear edge or in the region of its rear edge by at least one releasable fastening element to the container ceiling or is fastened thereto in the assembled state. This permits a particularly simple structural fastening of the intermediate wall. A further advantage is that the rear wall of the internal container is not interfered with. In this embodiment, in particular, a screw is screwed from the storage compartment through a screw hole in the intermediate wall.

It is one development that a screw hole adapter providing a screw hole is attached to the container ceiling, protruding in the direction of the intermediate wall. The screw guided through the intermediate wall is screwed or is to be screwed into the screw hole of the screw hole adapter as a releasable fastening element, or screwed out therefrom. The use of the screw hole adapter provides the advantage that this can also be configured as a spacer between the intermediate wall and the container ceiling, which facilitates a positionally accurate attachment of the intermediate wall in its rear edge. Alternatively or additionally, the intermediate wall can be fastened on its rear edge or in the region of its rear edge by at least one releasable fastening element to the rear wall of the internal container, or is fastened thereto in the assembled state.

It is one development that the intermediate wall has a projection protruding in the direction of the storage compartment in the region of the rear edge (in a front view) in front of the at least one fastening element or in front of the position provided for the fastening element. The projection advantageously conceals a direct view of the fastening element. The projection can be provided, for example, by reshaping the intermediate wall, if the intermediate wall is formed of sheet metal. It is one development that at least one light source is attached to the intermediate wall (in a front view) behind the projection. Thus the advantage is achieved that the projection can also serve to prevent a direct view of a user into the at least one light source and thus to prevent or at least impede glare.

It is one embodiment that the camera modules which are disposed one behind the other in each case have an image sensor or camera sensor attached to a module housing and the module housings in each case have at least one latching element, the module housings being disposed thereby on the storage compartment ceiling by latching. The latching element can be, for example, a latching hook, a latching eye, etc.

It is one development that the at least one camera module is non-destructively releasable, in particular also without the use of tools, from the storage compartment ceiling, in particular the intermediate wall. As a result, the camera module can be particularly easily replaced.

It is one development that the storage compartment ceiling, in particular the intermediate wall, can have an—in particular well-fitting—recess for inserting the respective module housing on the surface provided for the arrangement of a camera module. This facilitates the installation of the camera module and the electrical connection thereof.

It is one development that the module housing is latched to the storage compartment ceiling. The storage compartment ceiling itself serves as a counter-latching element for fastening the camera module. This provides the advantage that no further component is required for arranging the camera module on the storage compartment ceiling. In particular, the intermediate wall can serve as a support for the module housing latched thereto.

It is one development that the module housing is latched to a backing piece which is disposed on a side of the storage compartment ceiling facing away from the storage compartment, in particular the intermediate wall. This is advantageous since in this manner the shape of the intermediate wall can be easily maintained. The backing piece can be, for example, an injection-molded plastic part. The backing piece can be bonded to the storage compartment ceiling, for example by double-sided adhesive tape. It is one development that the backing piece has a bearing edge, the backing piece being positioned thereby on the storage compartment ceiling. The bearing edge can be configured and disposed, in particular, flush with an edge of the associated recess.

As described above, the camera modules or module housing thereof can be fastened directly to the ceiling of the internal wall or indirectly via an intermediate piece to the ceiling of the internal wall, for example via one respective backing piece, or even a common backing piece. A further possibility for indirect fastening of the camera modules via an intermediate piece is to fasten the camera modules to the ceiling via a common attachment which can be inserted or is inserted, in particular, into a well-fitting cutout of the storage compartment ceiling on the storage compartment side. The attachment can be configured in a similar manner to the above-described storage compartment ceiling, for example by having recesses for passing through the camera modules and/or backing pieces for fastening the camera modules. The backing pieces can, however, also be integrated in one piece in the attachment, for example as an injection-molded part. The attachment, in particular, is shell-shaped and advantageously inserted with its open upper face into the cutout of the storage compartment ceiling, in particular from the storage compartment. The use of the attachment provides the advantage that the assembly of the camera modules and the backing pieces—if present as separately manufactured components—can be implemented in a particularly simple manner.

It is one development that the module housing has at least one laterally protruding projection on the rear face and at an opposing point a flexible latching hook with a snap lug protruding in the opposing direction. Thus the advantage is achieved that the module housing can be fastened from the storage compartment without the use of tools by simply positioning the at least one laterally protruding projection onto the backing piece or directly onto the storage compartment ceiling, in particular intermediate wall, or by the positioning and subsequent rotation of the module housing about the at least one bearing point until the latching hook is latched behind the backing piece or the storage compartment ceiling or the attachment.

It is one development that the snap lug is accessible from the side in order to be unlatched. This provides the advantage that the camera module can be removed again from the storage compartment ceiling by simply pushing in the latching hook and rotating the module housing in the direction opposing that for the attachment.

It is one development that when the module housing protrudes into the storage compartment, the latching hook represents an extension of the module housing on the side facing away from the storage compartment and the module housing can be compressed on the region protruding into the storage compartment in such a way that the latching hook is moved sufficiently far that it is unlatched. Thus the advantage is achieved that the camera module is removable from the storage compartment ceiling without the use of tools, simply by access to the storage compartment.

With the foregoing and other objects in view there is provided, in accordance with another aspect of the invention, a household appliance having a storage compartment defined by an internal wall, the loading opening thereof being closable by at least one door, wherein at least one functional unit of the household appliance is disposed on a ceiling of the internal wall, the ceiling of the internal wall is at least in some regions a wall or a wall element ("intermediate wall") which is disposed on the storage compartment side spaced apart from a ceiling of an internal container, and the intermediate wall is a removable intermediate wall.

This household appliance has the advantage that if a functional unit is defective, this functional unit can be accessible in a particularly simple manner by removing the intermediate wall.

The ceiling of the internal wall is also denoted hereinafter as the "storage compartment ceiling," the ceiling of the internal container or inner liner also being denoted hereinafter as the "container ceiling." The internal container can also be denoted as the "inner liner." The internal wall of the at least one door facing the storage compartment, typically a plastic part, can also be assigned to the inner liner.

The household appliance can be a refrigerator, a freezer or a combination thereof. The storage compartment, in particular the refrigerator compartment, can be closed by one or more doors. The inner face(s) of the door(s) is/are configured, for example, with bottle racks, an egg rack, butter compartments, etc., in particular for depositing items to be stored. A refrigerator with two doors in a French door double-door arrangement is particularly advantageous, i.e. an arrangement in which two doors are attached on opposing sides and close the same storage compartment.

The storage compartment is provided to receive items to be stored for refrigeration. The storage compartment can have one or more shelves. The storage compartment can have one or more drawers, in particular special air-conditioned drawers, for example a VitaFresh drawer.

The usable storage compartment is defined on the left-hand side, right-hand side, rear side, bottom side and ceiling side by the internal wall. The front-side loading opening is closable by the at least one door. The internal wall can be formed of metal, plastic or a combination thereof, for example plastic-coated sheet metal.

The at least one functional unit can include, for example, a lamp, a pump, at least one water container, at least one camera module, etc. The at least one functional unit is, in particular, an electrically operated functional unit.

That the storage compartment ceiling is at least in some regions an intermediate wall means, in particular, that the storage compartment ceiling is formed entirely or partially by an intermediate wall. Where the storage compartment ceiling corresponds to the intermediate wall, the intermediate wall is disposed spaced apart below (and thus on the storage compartment side relative to) the container ceiling. Thus an intermediate space exists between the intermediate wall and the container ceiling disposed spaced apart thereabove.

That the intermediate wall is removable encompasses in one advantageous development that the assembled intermediate wall can be non-destructively removed, optionally also without the use of tools. This facilitates, for example, a subsequent reinsertion, for example after one or more functional units located thereon have been repaired, serviced or replaced. In one development, the assembled intermediate wall can also be removed from the internal wall without dismantling the internal container and/or an external housing.

It is one embodiment that at least one functional unit of the at least one functional unit which is disposed on the ceiling is disposed on the intermediate wall. Thus the advantage is achieved that this at least one functional unit is removable together with the intermediate wall and as a result can be quite particularly easily repaired, serviced or replaced.

Alternatively, the intermediate wall can be used as an assembly flap, at least one functional unit disposed on the container ceiling being able to be reached and thus also being able to be easily repaired, serviced or replaced in a particularly simple manner after the removal thereof, for example by service personnel.

It is one embodiment that the intermediate wall is an intermediate wall which is pivotable into the storage compartment. This facilitates handling of the intermediate wall after the release thereof. That the intermediate wall is pivotable into the storage compartment can encompass, in particular, that for removal it is rotatably positioned on the household appliance with one of its edges (for example—in a front view through the loading opening—with the front-side or front or rear side or rear edge; hereinafter also denoted as the "pivoting edge") while the other edges are lowered. As a result, the intermediate wall can also be brought out of engagement on the pivoting edge in order to be fully removed or detached from the remaining household appliance.

It is one embodiment that the intermediate wall is an intermediate wall which is pivotable about its front edge. The pivoting edge thus corresponds to the front edge. This has the advantage, amongst other things, that the front edge which is clearly visible to a user has no fastening elements and thereby a particularly unobtrusive impression of the storage compartment ceiling can be produced.

It is one embodiment that the intermediate wall can be fastened on its front edge by at least one tab. This permits a particularly simple handling on the front edge when removing and inserting the intermediate wall.

It is one development that the part of the household appliance to which the front edge of the intermediate wall can be fastened has at least one tab which can be brought into engagement with a corresponding opening in the intermediate wall. It is one development that the front edge of the intermediate wall can be fastened and has at least one tab which can be brought into engagement with an opposing part of the household appliance.

The tab can be a tab which is rectilinear in cross section or a curved tab, in particular curved in a hook-shaped manner. The tab can be bent out of the base body (intermediate wall or opposing part of the household appliance) or can have been retrospectively attached to the base body, for example by welding or TOX clinching.

The at least one tab can include exactly one tab or, for advantageously avoiding an oblique position and/or torsion of the intermediate wall, a plurality of tabs, in particular a plurality of tabs disposed adjacent to one another when viewed over the width of the storage compartment.

It is one embodiment that the intermediate wall can be fastened on its rear edge by at least one releasable fastening element, or is fastened in the assembled state. This provides the advantage that the fastening elements are not visible, or only poorly visible, to a user which permits a high-quality impression.

The releasable fastening element, in particular, is a fastening element which can be non-destructively inserted and released again, for example a screw, a clamping pin, a rotary pin, etc.

It is one development that in the inserted or assembled state of the intermediate wall the lateral edges (in a front view) are not fastened by a fastening element. This facilitates the removal of the intermediate wall and results in an improved impression. It is a further development that in the inserted or assembled state of the intermediate wall the lateral edges are also fastened by at least one fastening element. This results in a particularly stable mechanical fastening of the intermediate wall.

It is one embodiment that the intermediate wall and the container ceiling form one respective partial region of the storage compartment ceiling, the container ceiling (in a front view) is disposed in front of the front edge of the intermediate wall and the intermediate wall can be fastened on its front edge to the container ceiling by the at least one tab. Thus the advantage is achieved of a particularly simple manufacture of the household appliance and a particularly simple assembly and removal of the intermediate wall.

That the container ceiling is disposed in front of the front edge of the intermediate wall can encompass in one development that the storage compartment ceiling (in a front view) is divided into or is formed of a front portion which is formed by the container ceiling and a rear portion which is formed by the intermediate wall. In particular, the container ceiling and the intermediate wall substantially extend over the entire width of the storage compartment or the storage compartment ceiling. This is particularly simple in terms of manufacture and permits a particularly extensive configuration of the intermediate wall. In a further development, the container ceiling also surrounds the intermediate wall on the left-hand and/or right-hand side. In yet another development, the container ceiling surrounds the intermediate wall on all sides, i.e. also on the rear edge of the intermediate ceiling, so that in the inserted state the intermediate wall is inserted into a cutout of the container ceiling.

It is one embodiment that the container ceiling extends over an oblique step from a partial region disposed above the intermediate wall to a partial region disposed in front of the intermediate wall, and at least one recess is incorporated in the oblique step for receiving at least one tab of the front edge of the intermediate wall. This advantageously permits, in a manner which can be structurally easily implemented, a simple and accurate positioning of the container ceiling and the front edge of the intermediate wall to one another and also a narrow abutting edge, providing a high-quality impression. It is one development that the container ceiling and the intermediate wall adjoin one another at least approximately flush, in particular flush-mounted, in the surface of the storage compartment ceiling.

It is one embodiment that the front edge of the intermediate wall is an oblique bent-up edge from which the at least one tab is bent out—in particular to the front—and which is configured in accordance with the oblique step of the container ceiling, i.e. in particular has the same oblique position. This provides the advantage that the storage compartment is separated from the intermediate space formed between the intermediate wall and the container ceiling by a narrow and long gap between the oblique portions, which additionally can be easily sealed, for example by inserting a thin insulating layer.

It is one embodiment that on the side of the oblique step facing away from the storage compartment an adapter piece is positioned on one respective recess and the tabs are inserted in respective adapter pieces or positioned thereon. This provides the advantage that the intermediate space between the intermediate wall and the container ceiling is separated from the intermediate space between the container ceiling and the external housing. Thus when the intermediate space between the container ceiling and the external housing is filled with thermally insulating foam, it can be advantageously prevented that this foam also passes into the intermediate space between the intermediate wall and the container ceiling. A further advantage is that the adapter piece can be of relatively complex construction with simple manufacture and thereby also permits a more accurate positionability, a more reliable hold and also an avoidance of squeaking noises of the tabs, in particular if the adapter piece is formed of plastic. The tabs in this embodiment are thus not directly inserted into the respective recesses but are inserted into an adapter piece or located thereon. The adapter piece can be inserted in the recess, latched and/or bonded to the step. The adapter piece has, in particular, a protrusion into which the tab can engage or engages in the assembled state.

It is one embodiment that the intermediate wall can be fastened on its rear edge or in the region of its rear edge by at least one releasable fastening element to the container ceiling or is fastened thereto in the assembled state. This permits a particularly simple structural fastening of the intermediate wall. A further advantage is that the rear wall of the internal container is not interfered with. In this embodiment, in particular, a screw is screwed from the storage compartment through a screw hole in the intermediate wall.

It is one embodiment that a screw hole adapter providing a screw hole is attached to the container ceiling, protruding in the direction of the intermediate wall. The screw guided through the intermediate wall is screwed or is to be screwed into the screw hole of the screw hole adapter as a releasable fastening element, or screwed out therefrom. The use of the screw hole adapter provides the advantage that this can also be configured as a spacer between the intermediate wall and the container ceiling, which facilitates a positionally accurate attachment of the intermediate wall in its rear edge.

Alternatively or additionally, the intermediate wall can be fastened on its rear edge or in the region of its rear edge by at least one releasable fastening element to the rear wall of the internal container, or is fastened thereto in the assembled state.

It is one embodiment that the intermediate wall has a projection protruding in the direction of the storage compartment in the region of the rear edge (in a front view) in front of the at least one fastening element or in front of the position provided for the fastening element. The projection advantageously conceals a direct view of the fastening element. The projection can be provided, for example, by reshaping the intermediate wall, if the intermediate wall is formed of sheet metal.

It is one embodiment that at least one light source is attached to the intermediate wall (in a front view) behind the projection. Thus the advantage is achieved that the projection can also serve to prevent a direct view of a user into the at least one light source and thus to prevent or at least impede glare. The at least one light source thus represents a further functional unit.

It is one embodiment that at least one functional unit disposed on the intermediate wall is a camera module. This advantageously permits a recording of images of items to be stored which are deposited on a door inner face and/or of items to be stored which are located in an extended drawer, with a particularly good overview.

It is one embodiment that at least one camera module has a camera sensor disposed on a module housing and the module housing has at least one latching element, the module housing being disposed thereby on the intermediate wall by latching. The camera sensor can be latched, for example, to the module housing.

The latching element can be, for example, a latching hook, a latching eye, etc.

It is one development that the at least one camera module is also non-destructively releasable, in particular also without the use of tools, from the intermediate wall. As a result, it can be particularly easily replaced.

It is one development that the intermediate wall has an—in particular well-fitting—recess for inserting the module housing on the surface provided for the arrangement of the camera module. This facilitates the installation of the camera module and the electrical connection thereof.

It is one embodiment that the module housing is latched to the intermediate wall. The intermediate wall itself serves as a counter-latching element for fastening the camera module. This provides the advantage that no further component is required for arranging the camera module on the intermediate wall. In particular, the intermediate wall can serve as a support for the module housing latched thereto.

It is one embodiment that the module housing is latched to a backing piece which is disposed on a side of the intermediate wall facing away from the storage compartment. This is advantageous since in this manner the shape of the intermediate wall can be easily maintained. The backing piece can be, for example, an injection-molded plastic part. The backing piece can be bonded to the intermediate wall, for example by double-sided adhesive tape. It is one development that the backing piece has a bearing edge, the backing piece being positioned thereby on the intermediate wall. The bearing edge can be configured and disposed, in particular, flush with an edge of the associated recess.

Additionally or alternatively to the possibility of fastening the camera modules or module housing thereof directly or indirectly via an intermediate piece (for example via one respective backing piece or even a common backing piece) on the intermediate wall, a further possibility for indirect fastening of the camera modules via an intermediate piece is to fasten the at least one camera module via an attachment to the intermediate wall.

The attachment can be insertable or inserted, in particular, on the storage compartment side into a well-fitting cutout of the intermediate wall. The attachment can be configured in a similar manner to the above-described intermediate wall, for example by having at least one recess for passing through one respective camera module and/or at least one backing piece for fastening one respective camera module. The backing pieces can, however, be integrated in one piece in the attachment, for example as an injection-molded part. The attachment, in particular, is shell-shaped and advantageously inserted with its open upper face into the cutout of the intermediate wall, in particular from the storage compartment. The use of the attachment provides the advantage, in particular when using a plurality of camera modules, that the assembly of the camera modules and the backing pieces—if present as separately manufactured components—can be implemented in a particularly simple manner.

It is one embodiment that the module housing has at least one laterally protruding projection on the rear face and at an opposing point a flexible latching hook with a snap lug protruding in the opposing direction. Thus the advantage is achieved that the module housing can be fastened from the storage compartment without the use of tools by simply positioning the at least one laterally protruding projection on the backing piece or directly onto the intermediate wall and subsequently rotating the module housing about the at least one bearing point until the latching hook is latched behind the backing piece or the intermediate wall.

It is one embodiment that the snap lug is accessible from the side in order to be unlatched. This provides the advantage that the camera module can be removed again from the intermediate wall by simply pushing in the latching hook and rotating the module housing in the direction opposing that for the attachment.

It is one embodiment that the module housing protrudes into the storage compartment, the latching hook represents an extension of the module housing on the side facing away from the storage compartment, and the module housing can be compressed on the region protruding into the storage compartment in such a way that the latching hook is moved sufficiently far that it is unlatched. Thus the advantage is achieved that the camera module is removable from the intermediate wall without the use of tools, simply by access to the storage compartment.

It is one development that a plurality of camera modules are disposed on the intermediate wall.

It is one embodiment that a first camera module protruding into the storage compartment, the camera sensor thereof having an optical axis oriented obliquely to the front, and a second camera module terminating approximately flush-mounted with the intermediate wall, the camera sensor thereof having an at least approximately downwardly oriented optical axis, are disposed on the intermediate wall. Thus the advantage is achieved that images which show items to be stored which are deposited on inner face(s) of the door(s) or items to be stored which are deposited in open drawers can be recorded particularly clearly and comprehensively. A further advantage is that by the at least approximately flush-mounted termination of the second camera module, the second camera module does not interfere with the removal of items to be stored. An "at least approximately" flush-mounted arrangement can be understood to mean an arrangement in which the second camera module, when viewed from the storage compartment, is incorporated in the intermediate wall parallel to the intermediate wall. It is one development that the second camera module can be disposed slightly recessed relative to the intermediate wall, for example between 0.1 mm and 0.3 mm, in particular ca. 0.2 mm. Alternatively, the second camera module can be incorporated exactly flush-mounted in the intermediate wall.

For a household appliance with a French door double-door arrangement, it is an advantageous development that the first camera module is disposed in a front view at least approximately centrally to the two doors or in the region of the abutting edge of the two doors, since the inner faces of both doors can be kept particularly easily in the field of view of the camera sensor of the first camera module. This also results in a cost saving since a separate camera module does not have to be provided for each of the two doors. This applies, in particular, if the field of view of the camera sensor is oriented in such a way that it records images in landscape format, i.e. with a wide-angle function. This can similarly apply to the second camera module, in particular if two drawers are disposed adjacent to one another in the storage compartment in a front view.

With the foregoing and other objects in view there is provided, in accordance with a further aspect of the invention, a method for releasing or removing the intermediate wall of the household appliance, in particular the refrigerator as described above, from the storage compartment ceiling in which the at least one releasable fastening element (for example at least one screw) is released, the intermediate wall on its edge opposing the pivoting edge being lowered by simultaneously pivoting on the pivoting edge and on the pivoting edge being brought out of engagement with the part of the household appliance there. The method can be configured in a similar manner to the household appliance, and vice versa, and has the same advantages. The reinstallation of the intermediate wall can be carried out in reverse sequence.

Thus it is one embodiment that the at least one fastening element located in the region of the rear edge of the intermediate wall is released, the intermediate wall is lowered on its rear edge and the at least one tab located on the front edge of the intermediate wall is moved out of its recess in the container ceiling.

With the foregoing and other objects in view there is provided, in accordance with an added aspect of the invention, a household appliance having a storage compartment defined by an internal wall, the loading opening thereof being closable by at least one door, wherein at least one camera module with an image sensor or camera sensor, which is disposed on a module housing, is disposed on the internal wall and wherein the module housing has at least one snap element, the module housing being disposed thereby by locking on the internal wall.

This household appliance has the advantage that an assembly of the camera module on the internal wall can be possible in a particularly simple manner, in particular without the use of tools, and also can be easily replaced in the case of servicing.

It is one development that the locking can be released non-destructively, in particular also without the use of tools, which permits a particularly simple replacement of the camera module. The locking is preferably a latched connection or snap connection.

The household appliance can be a household refrigerator, a freezer or a combination thereof. The storage compartment in a household refrigerator is a refrigerating zone which can be closed by one or more doors. The inner face(s) of the door(s) is/are configured in a household refrigerator, for example, with bottle racks, an egg rack, butter compartments, etc., in particular for depositing items to be stored, in particular refrigerated items. A household appliance, in particular a household refrigerator, with two doors in a French door double-door arrangement, i.e. an arrangement in which two doors are attached on opposing sides and close the same refrigeration space, is particularly advantageous.

The storage compartment is preferably a refrigerating zone and is provided to receive refrigerated items for refrigeration. The refrigerating zone can have one or more shelves. The storage compartment can have one or more drawers, in particular special air-conditioned drawers, for example a VitaFresh drawer.

The usable storage compartment is defined on the left-hand side, right-hand side, rear side, bottom side and ceiling side by the internal wall. The front-side loading opening is closable by the at least one door. The internal wall can be formed of metal, plastic or a combination thereof, for example plastic-coated sheet metal.

The snap element can be, for example, a snap hook, a snap eye, etc.

That an image sensor or camera sensor is disposed on a module housing can encompass, in particular, that it is fastened to the module housing, for example by snapping, inserting, clamping and/or bonding. The camera sensor can be present, in particular, in the module housing.

It is one development that the internal wall has an—in particular well-fitting—recess for inserting the module housing on the surface provided for the arrangement of the camera module. This facilitates the installation of the camera module and the electrical connection thereof.

It is one embodiment that the module housing is locked on the internal wall. The internal wall itself serves as a counter-latching element for fastening the camera module. This provides the advantage that no further component is required for arranging the camera module on the internal wall. In particular, the internal wall can then serve as a support for the module housing which is snapped or locked thereon.

It is one embodiment that the module housing is locked by a backing piece which is disposed on a side of the intermediate wall facing away from the storage compartment. This is advantageous since in this manner the shape of the intermediate wall can be easily maintained. The backing piece can be, for example, an injection-molded plastic part. The backing piece can be bonded to the internal wall, for example by double-sided adhesive tape. It is one development that the backing piece has a bearing edge, the backing piece being positioned thereby on the internal wall. The bearing edge can be configured and disposed, in particular, flush with an edge of the associated recess.

It is one embodiment that the module housing has on the rear face at least one laterally protruding projection and on the opposing point a flexible snap hook with a snap lug protruding in the opposing direction. Thus the advantage is achieved that the module housing can be fastened from the storage compartment without the use of tools by simply positioning the at least one laterally protruding projection onto the backing piece or directly onto the internal wall or attachment and subsequently rotating the module housing about the at least one bearing point until the snap hook can be locked by being snapped behind the backing piece or the internal wall. The laterally protruding projection is preferably configured as an elongated rib which extends along one edge of the cutout or the backing piece.

As described above, the at least one camera module or module housing thereof can be fastened directly on the internal wall or indirectly via an intermediate piece on the internal wall, for example via a backing piece. A particularly advantageous further possibility for indirect fastening via an intermediate piece, in the case of the provision of a plurality of camera modules, is to fasten the camera modules via a common attachment on the internal wall which can be inserted or is inserted, in particular, on the storage compartment side into a well-fitting cutout of the internal wall. The attachment can be configured in a similar manner to the above-described internal wall, for example by having recesses for passing through the camera modules and/or backing pieces for fastening, in particular latching the camera modules. The backing pieces can, however, also be integrated in one piece in the attachment, for example as an injection-molded part. The attachment, in particular, is shell-shaped and advantageously is inserted with its open upper face into the cutout of the internal wall, in particular from the storage compartment. The use of the attachment provides the advantage that the assembly of the camera modules and the backing pieces—if present as separately manufactured components—can be implemented in a particularly simple manner.

It is one embodiment that the snap lug is accessible or is exposed from the side for non-destructive unlocking. Preferably, the snap lug is accessible through at least one lateral recess in the module housing. This provides the advantage that the camera module can be removed again from the internal wall or intermediate wall or attachment by pushing in the snap hook from the side (and thus a non-destructive release of the snap connection or latched connection) and then rotating the module housing in the direction opposing that for the attachment, or toward the storage compartment.

It is one embodiment that the module housing protrudes into the storage compartment, the snap hook represents an extension of the module housing on the side facing away from the storage compartment and the module housing can be compressed on the region protruding into the storage compartment in such a way that the snap hook is moved sufficiently far that it is unlocked. Thus the advantage is achieved that the snap connection can be released, in particular, non-destructively and the camera module is removable from the internal wall without the use of tools, simply by access to the storage compartment.

It is one embodiment that at least one camera module is disposed on a ceiling of the internal wall. This is particularly advantageous since a particularly good view is permitted of the inner face(s) of the door(s) and from above into the open drawers.

It is one development that a plurality of camera modules are disposed on the ceiling of the internal wall.

It is one embodiment that a first camera module protruding into the storage compartment, the camera sensor thereof having an optical axis oriented obliquely to the front, and a second camera module terminating substantially flush-mounted with the ceiling, the camera sensor thereof having an at least approximately downwardly oriented optical axis, are disposed on the ceiling of the internal wall. Thus the advantage is achieved that images which show particularly clearly and comprehensively items to be refrigerated which are deposited on the inner face(s) of the door(s) or items to be refrigerated which are deposited in open drawers can be recorded. A further advantage is that due to the flush-mounted termination of the second camera module, the second camera module does not interfere with the image recording of the inner face(s) of the door(s) by the first camera module and when items to be refrigerated are removed.

For a household appliance with a French door double-door arrangement, it is an advantageous development that the first camera module is disposed in a front view at least approximately centrally to the two doors or in the region of the abutting edge of the two doors, since the inner faces of both doors can be kept particularly easily in the field of view of the camera sensor of the first camera module. This also results in a cost saving since a separate camera module does not have to be provided for each of the two doors. This applies, in particular, if the field of view of the camera sensor is oriented in such a way that it records images in landscape format, optionally with a wide-angle function. This can similarly apply to the second camera module, in particular if two drawers are disposed adjacent to one another in the storage compartment in a front view.

It is one embodiment that the ceiling of the internal wall is at least in some regions an intermediate wall or is formed by an intermediate wall which is disposed spaced apart from a ceiling of an internal container on the storage compartment side and the intermediate wall is a movable, in particular removable, intermediate wall. This facilitates handling of the intermediate wall after the assembly of the household appliance. The ceiling is movable as an intermediate wall, in particular, after releasing at least one releasable fixing device.

It is one embodiment that the intermediate wall is an intermediate wall which is pivotable into the storage compartment. Thus the intermediate wall can be advantageously handled particularly easily. In particular, the access to the regions of the camera modules facing away from the storage compartment and disposed on the intermediate wall, and optionally other components, is facilitated in a simple manner. This can be achieved, for example, in that the ceiling is pivotably attached on its rear edge (in a front view) relative to the rear wall of the internal wall, and on its front-side edge is held by at least one releasable fixing device, in particular on the ceiling of the internal container. If the at least one fixing device is not released, the ceiling of the internal wall is thus held, in particular, by the ceiling of the internal container and the rear wall. If the at least one fixing device is released, in one possible development the front-side edge drops down and the ceiling of the internal wall pivots together with the components attached thereto, in particular at least one camera module, about the rear edge into the storage compartment. As a result, the rear faces of the ceiling and the components attached thereto are particularly easily accessible, which in particular considerably facilitates an attachment and a replacement of the camera modules.

It is one embodiment that a camera printed circuit board with a camera sensor and a communication printed circuit board with a cable plug connector, which are disposed one on top of the other in the module housing, are disposed in the module housing. Preferably, the main surfaces of the camera printed circuit board and communication printed circuit board extend parallel to one another. The communication printed circuit board in the installed state is preferably disposed or stacked in the vertical direction of the camera module above the camera printed circuit board. Moreover, the camera printed circuit board has an optical system on the side of the camera printed circuit board which in the installed state faces in the direction of an open front face or bottom plate of the module housing. The cable plug connector is disposed on the side of the communication printed circuit board which in the installed state faces in the direction of the open front face or bottom plate of the module housing. The cable plug connector is preferably connected to a corresponding mating plug connector which is soldered to the communication printed circuit board. The camera sensor is preferably soldered to the camera printed circuit board. By dividing the components into a plurality of printed circuit boards, the camera module can be configured to be more compact and the arrangement of the camera modules in the storage compartment takes up less volume.

It is one embodiment that the communication printed circuit board is connected to the camera printed circuit board via a flexible conductor film for data and signal transmission and power supply. The ends of the flexible conductor film are connected in each case to corresponding plug connectors of the camera and communication printed circuit board and the plug connectors are preferably soldered in each case to the printed circuit boards. As a result, it is achieved that the communication printed circuit board, which also can be connected via the cable plug connector to an external interface or central control unit of the household appliance, and the camera printed circuit board can communicate with one another by simple measures and the camera printed circuit board is electrically powered.

It is one embodiment that the module housing is configured in multiple pieces, the communication printed circuit board is held via a first fastening structure on the module housing and the camera printed circuit board is held via a second fastening structure on an attachment of the module housing. The communication printed circuit board can be provided to this end by the fastening structure on an open upper face of the module housing, and the camera printed circuit board can be fastened on an open front face to the attachment via the further fastening structure. The open front face substantially opposes the open upper face. Thus the printed circuit boards are accessible from different sides of the module housing and more easily assembled and disassembled. The fastening structures also have a plurality of holding arms with latching lugs provided on the free ends and lower abutments relative to the latching lugs, wherein the camera printed circuit board and communication printed circuit board are clamped between the latching lugs and the holding arms and support surfaces of the abutments. The fastening structures can be configured integrally with the attachment or module housing.

It is one embodiment that the module housing is configured in one piece, the camera printed circuit board is held via a fastening structure protruding from a bottom plate of the module housing and the communication printed circuit board is held via a clamp for the cable plug connector on the module housing. The fastening structure has a plurality of holding arms with latching lugs provided on the free ends and has lower abutments relative to the latching lugs, wherein the camera printed circuit board is clamped between the latching lugs of the holding arms and a support surface of the abutments in the installed state. The fastening structure can be configured integrally with the module housing. The clamp can have clamping arms with holding lugs which enclose or define a plug socket. The holding lugs encompass the assembled cable plug connector in the plug socket and hold this in position. To this end, the holding lugs protrude into the plug socket. This embodiment has the advantage that the mounting of the printed circuit boards is simplified.

With the foregoing and other objects in view there is provided, in accordance with a concomitant aspect of the invention, a method for fastening at least one camera module to an internal wall of a household appliance defining a storage compartment as described above, in which the module housing is positioned from the storage compartment in the oblique position on the side of the internal wall facing away from the storage compartment or on a backing piece disposed therein, and then is by pivoting into the upright position.

The method can be configured in a similar manner to the household appliance and vice versa and has the same advantages.

Other features which are considered as characteristic for the invention are set forth in the appended claims.

Although the invention is illustrated and described herein as embodied in a household appliance with a camera module, a method for releasing an intermediate wall and a method for fastening a camera module to an internal wall, it is nevertheless not intended to be limited to the details shown, since various modifications and structural changes may be made therein without departing from the spirit of the invention and within the scope and range of equivalents of the claims.

The above-described properties, features and advantages of this invention and the manner in which they are achieved will become clearer and more easily understandable in connection with the following description of exemplary embodiments which are explained in more detail in connection with the diagrammatic drawings.

DETAILED DESCRIPTION OF THE INVENTION

Figure 1:
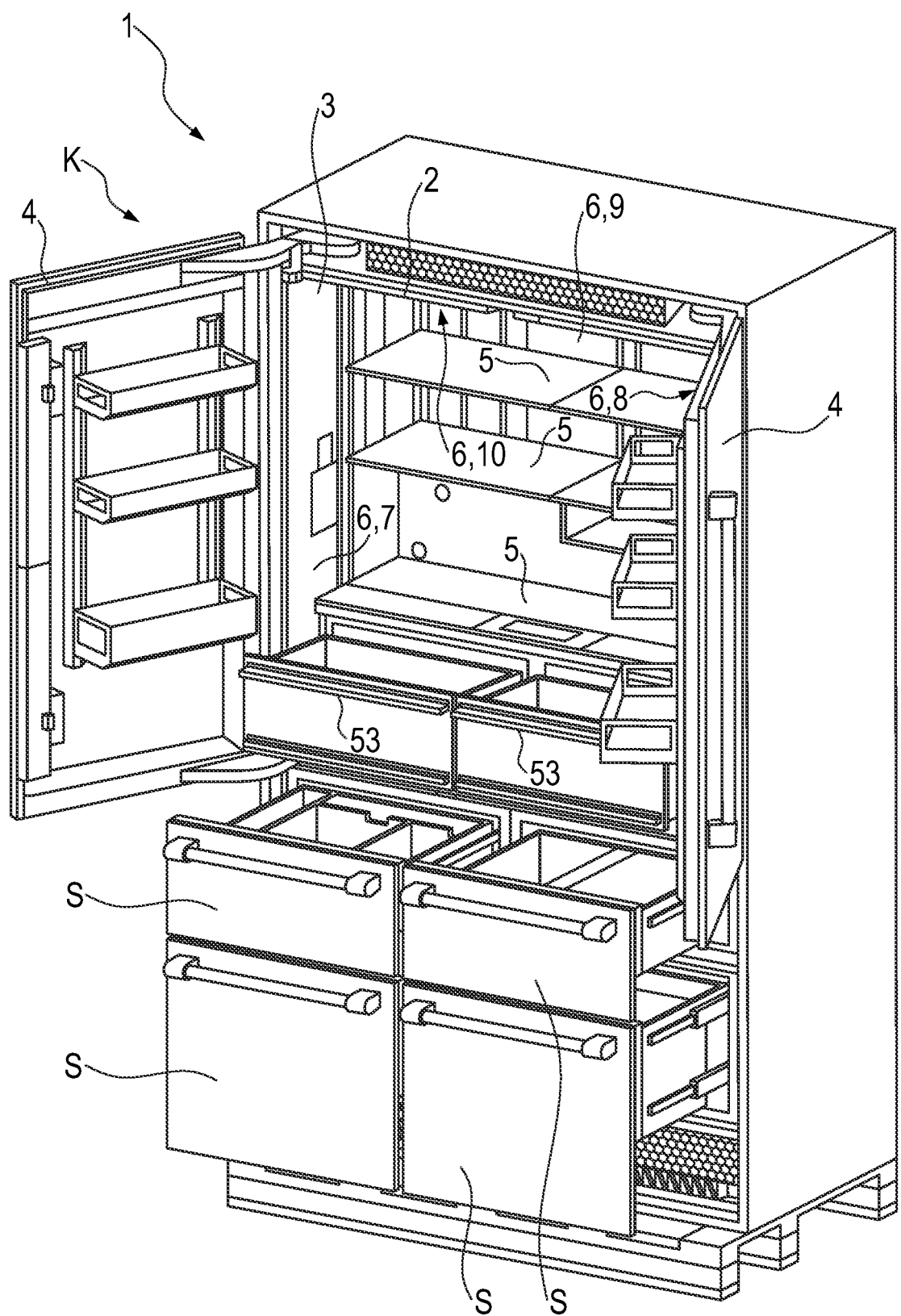
FIG. 1 is a diagrammatic, perspective view from the front of a household appliance, in particular a refrigerator.

Referring now to the figures of the drawings in detail and first, particularly, to FIG. 1 thereof, there is seen a perspective view from the front of a household appliance 1, in particular a refrigerator K. The refrigerator K also includes refrigerated drawers S with special refrigeration functions, for example ice box, freezer compartment, etc. The refrigerator K and the refrigerated drawers S thereof are surrounded by an external housing, which is concealed in the drawing by surrounding furniture or cabinetry 60.

The refrigerator K has a storage compartment 3 which can be loaded with items to be stored through a front-side loading opening 2. The loading opening 2 is closable by at least one door 4. For example, one or more shelves 5 can be located in the storage compartment 3. The two door leaves or doors 4 are present in a French door arrangement in which they close the same storage compartment 3 and are attached to opposing sides of an external housing 49.

The storage compartment 3 is defined by an internal wall 6 of which (in a view through the loading opening 2) a left-hand side wall 7, a right-hand side wall 8, a rear wall 9, and a ceiling ("storage compartment ceiling") 10 are shown here. A bottom of the internal wall 6 is concealed by two drawers 53, shown extended here, in particular including at least one VitaFresh drawer. The internal wall 6 or the components 6 to 10 thereof can be formed of metal, plastic or a combination thereof (for example a plastic-coated sheet metal).

Figure 2:
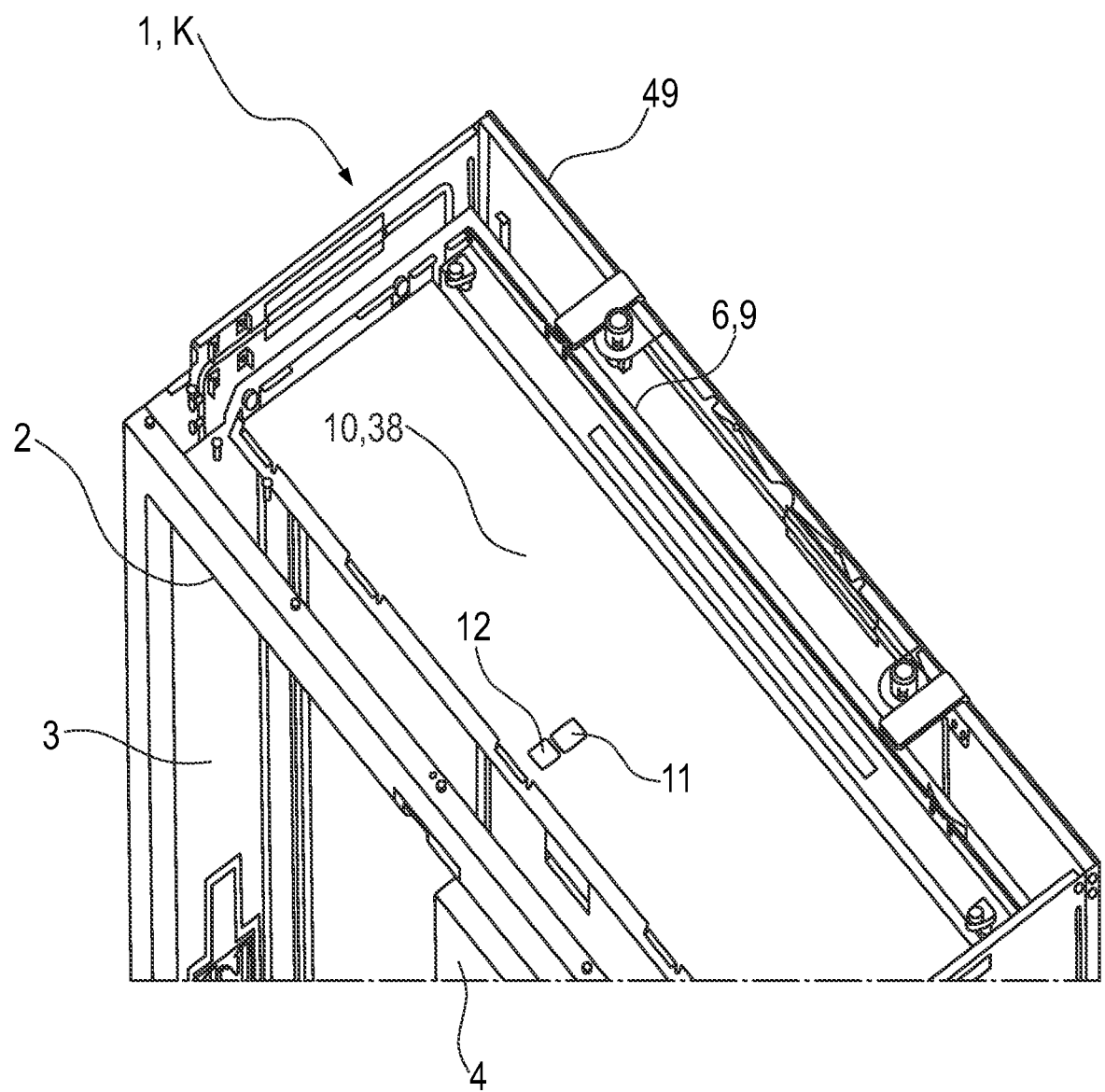
FIG. 2 is a perspective view from above of a detail of the refrigerator of FIG. 1.

FIG. 2 shows in a perspective view from above a detail of the refrigerator K which is shown without the external housing 49.

The left-hand side wall 7, the right-hand side wall 8, the rear wall 9 and the bottom (not illustrated) of the internal wall 6 represent sides of a common internal container 6-9, 37, while this relates only partially to the storage compartment ceiling 10. The internal container 6-9, 37 is enclosed by the external housing 49 and the intermediate space between the internal container 6-9, 37 and the external housing 49 is preferably filled with heat insulating material (not illustrated), for example insulating foam.

In the intermediate wall 38 two—in particular identical—recesses 11 and 12 are also present, the recess 11 thereof being disposed behind the recess 12 in a front view and thus also being removed further away from the loading opening 2. The recesses 11 and 12 both have a rectangular basic shape with rounded corners.

Figure 3:
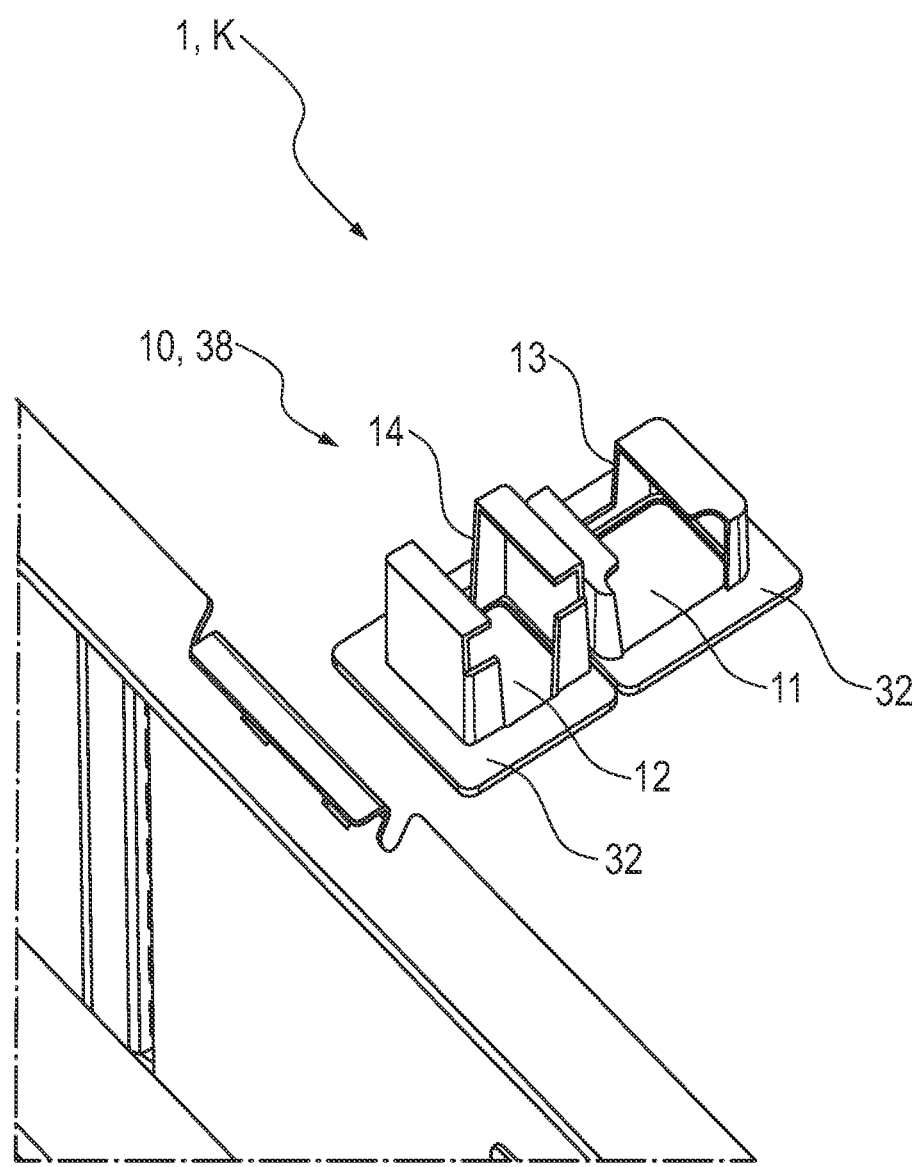
FIG. 3 is a perspective view of a detail of the view of FIG. 2 with additional components.

FIG. 3 shows a detail of the refrigerator K in a view similar to FIG. 2, wherein a lower backing piece 13 and a higher backing piece 14 are positioned on edge regions of the (rear) side of the intermediate wall 38 facing away from the storage compartment which surround the recesses 11 and 12. The backing pieces 13 and 14 are provided to arrange and to fix a first camera module 15 (see FIG. 4 and FIG. 5) or a second camera module 16 (see FIG. 12 and FIG. 13) on the intermediate wall 38. The backing pieces 13, 14 in each case bear with a bearing edge 32 against the rear face of the intermediate wall 38. The backing pieces can be fastened, for example, by double-sided adhesive tape to the intermediate wall 38.

Figure 4:
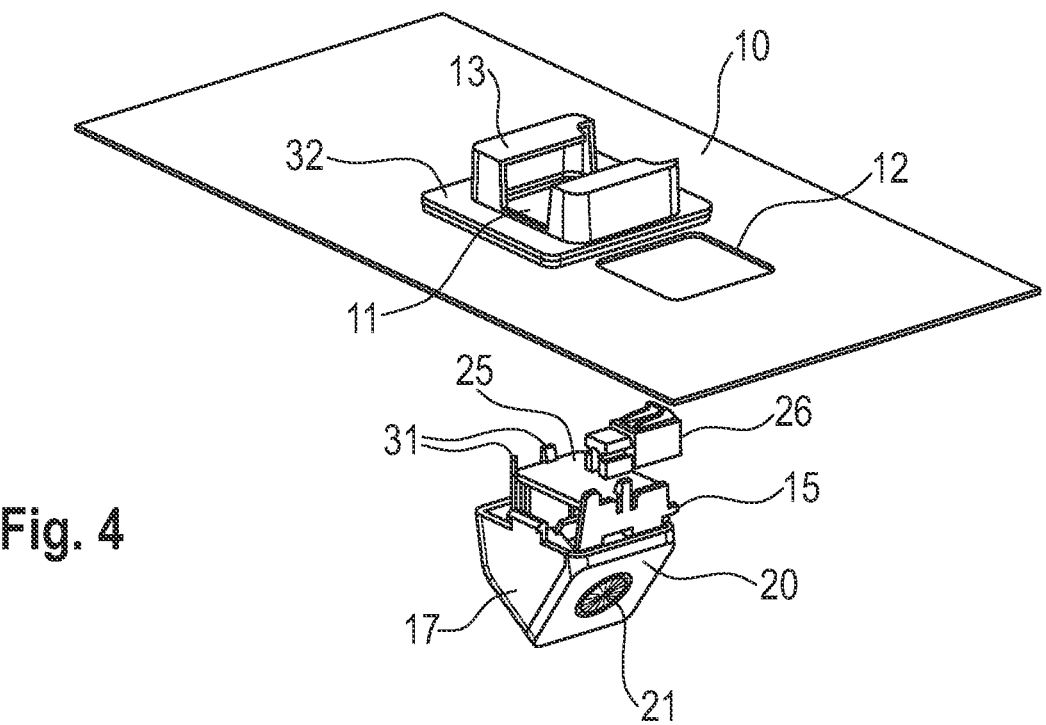
FIG. 4 is a perspective view from above of a detail of an intermediate wall of a ceiling of a storage compartment of the refrigerator of FIG. 2 with a backing piece and a first camera module.

FIG. 4 shows in a perspective view from above a detail of the intermediate wall 38 with the backing piece 13 assigned to the recess 11 and the first camera module 15, not yet assembled, which is shown located below the intermediate wall 38.

Figure 5:
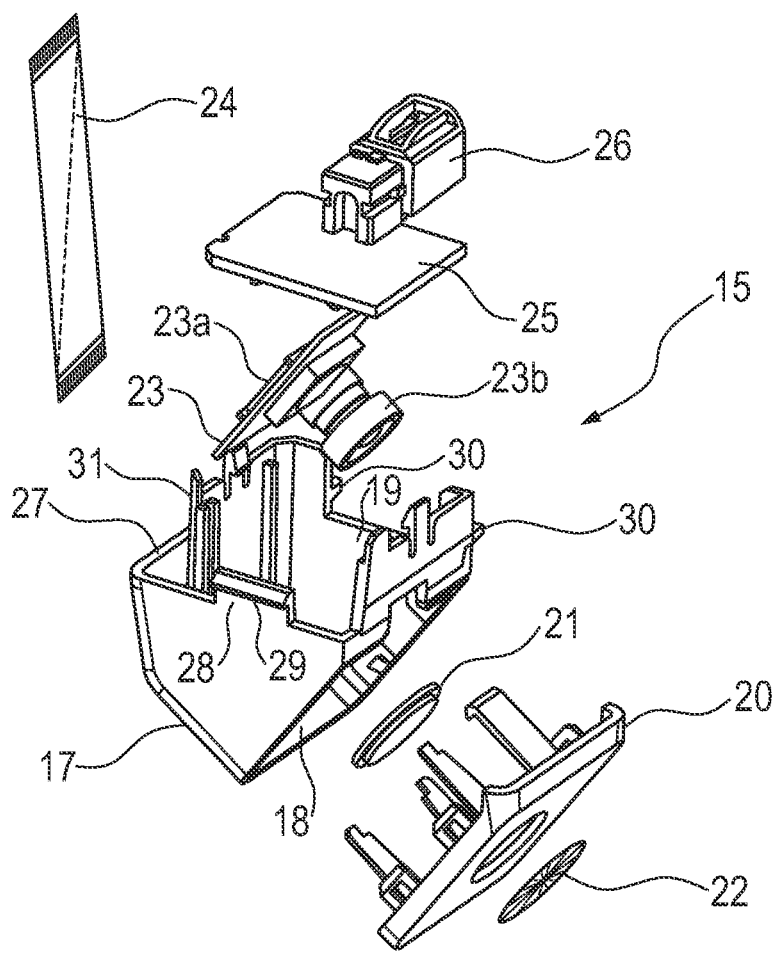
FIG. 5 is a perspective view from above of the first camera module in an exploded view.

FIG. 5 shows in a perspective view from above the camera module 15 in an exploded view. The camera module 15 is provided to protrude substantially into the storage compartment 3 and to permit the recording of items to be stored which are deposited in the inner face(s) of the door(s) 4.

The camera module 15 can have by way of example the following components: a cup-shaped module housing 17 with two open sides 18 and 19, namely an open front face 18 facing in the direction of the loading opening 2 and an open upper face 19 to be positioned on the recess 11.

An attachment 20, into which a light guide element 21 can be inserted on the housing side, can be clipped, positioned, snapped and/or bonded to the open front face 18. The light guide element 21 can, for example, be an injection-molded part formed of transparent plastic and, for example, form an optical lens which is inserted into an opening of the attachment 20. Alternatively, the attachment 20 and the light guide element 21 are manufactured in one piece by using a two-component plastic injection-molding method.

A demisting film 22 can be provided on the front face of the attachment 20 on the storage compartment side.

A camera printed circuit board 23 which has a camera sensor 23a (for example a CCD sensor), an electronics module, optionally an optical system 23b disposed upstream of the camera sensor 23a, optionally a flash light and optionally further functional units, can be inserted into the module housing 17. The camera printed circuit board 23 can be fixed in the module housing 17, for example by latching, inserting and/or bonding.

The camera printed circuit board 23 is connected via a flexible printed circuit board or flexible conductor film (FPC; "flexible printed circuit") 24 (see FIG. 13) for data and signal transmission and power supply to a printed circuit board ("communication or connecting printed circuit board") 25 which bears electronic components in order to connect the camera printed circuit board 23 to a central processor of the refrigerator K for supplying data, signals and power, for example via a corresponding cable such as a USB cable, a FPD link III-compatible twisted pair cable or coaxial cable, etc. The communication or connecting printed circuit board 25 has a cable plug connector 26 for the cable connection.

On the rear side, a latching hook 28 with a snap lug 29 protruding outwardly to the side (in a plan view) protrudes on a rear edge 27 of the module housing 17 which surrounds the open upper face 19. Two projections 30 protruding to the side in the opposing direction relative to the latching hook 28 are located on the opposing edge portion. While the edge 27 can be inserted in a well-fitting manner into the recess 11 and thus bears against the edge of the recess 11, the snap lug 29 and the projections 30 with the inserted module housing 17 protrude to the side over the recess 11 and engage therebehind.

A fastening structure 31 also stands vertically from the module housing 17 through the open upper face 19 to which the communication or connecting printed circuit board 25 can be fastened, in particular can be latched.

The assembly of the camera module 15 can take place, in particular, without the use of tools, for example as follows:

Initially the attachment 20 is placed on the module housing 17 so that the attachment 20 covers the open front face. Snap tabs of the attachment 20 engage in hooks of the module housing 17. The light guide element 21 can be already injection-molded into the attachment 20, for example by using a two-component injection-molding method. The camera printed circuit board 23 is already connected via the flexible conductor film 24 to the communication or connecting printed circuit board 25. The camera printed circuit board 23 is firstly assembled in a holder on the attachment provided therefor. Then the communication or connecting printed circuit board 25 is clipped onto the fastening structure 31 of the module housing 17.

Figure 6:
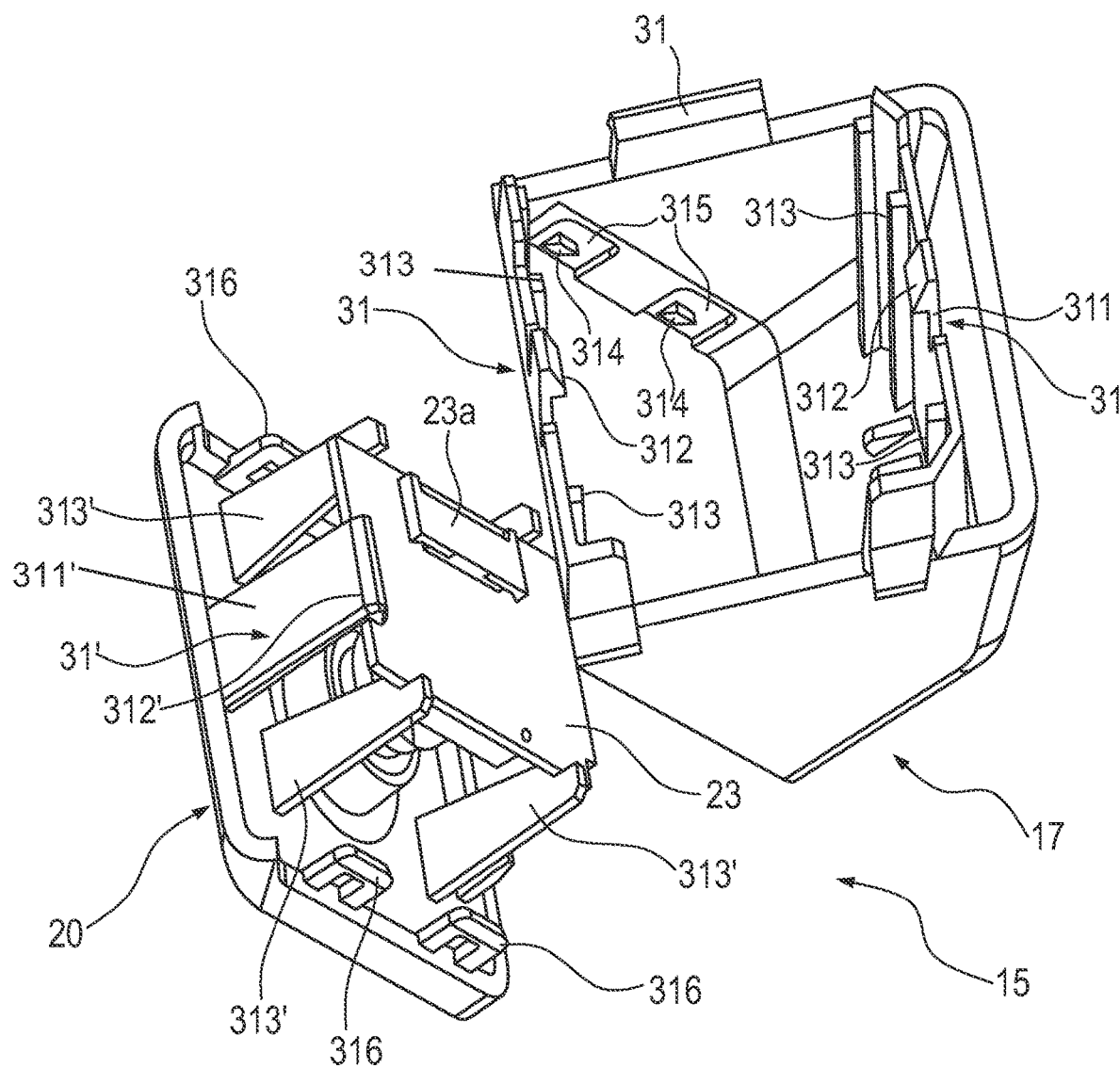
FIG. 6 is a perspective view of the first camera module in a further exploded view.

FIG. 6 shows in a further exploded view the camera module 15. The camera module 15 has the module housing 17 with the fastening structure 31 which stands vertically through the open upper face 19 thereof. The fastening structure 31 is integrally formed with the module housing 17. The communication printed circuit board 25, not shown therein, can be anchored to the fastening structure 31 of the module housing 17. The fastening structure 31 has a plurality of holding arms 311, protruding from the open upper face 19, latching lugs 312 oriented inwardly to the side being provided on the free ends thereof. A plurality of abutments 313 are present with a support surface disposed at the free end, on which the communication printed circuit board 25, not shown here, is also positioned in the assembled state. The support surface of the abutments 313 is located lower than the latching lugs 312. The abutment 313 in the embodiment is configured as an elongated rib which runs parallel and offset to the holding arms 311. In the embodiment, a total of four abutments 313, which are provided in the lateral corner regions of the module housing 17, are provided. For assembly, the communication printed circuit board 23 is pushed into the fastening structure 31 of the module housing 17, whereby the latching lugs 312 are forced to the side. If the communication printed circuit board 25 is positioned on the abutments 313, the latching lugs 312 snap back and encompass the communication printed circuit board 2 so that the latching lugs 312 hold the communication printed circuit board 25 on the support surfaces of the abutments 313 and hold it fixedly in position.

A further fastening structure 31', which holds the camera printed circuit board 23 is also present in FIG. 6 on the attachment 20. The further fastening structure 31' has holding arms 311', latching lugs 312' also being provided on the free ends thereof. Abutments 313' are provided with the holding arms 311', the abutments having a support surface on the free end which is lower than the latching hooks 312'. A total of four abutments 313' which are disposed in each case in the corner regions of the attachment 20 are provided. The further fastening structure 31' in this case is integrally formed with the attachment 20. During assembly, the camera printed circuit board 23 is pushed into the further fastening structure 31', wherein the holding arms 311' or latching hooks 312' are displaced thereby and pushed onto the bearing surfaces of the abutments 313'. The camera printed circuit board 23 in the assembled state is laterally encompassed by the latching hooks 312' and held in position by the abutments 313'. Closed eyes 316 are also provided on the edge region of the attachment 20, which are engaged with latching elements 314, in particular hook-shaped latching projections, in the interior of the module housing 17 when the attachment 20 is fastened to the module housing 17. In the assembled state of the camera module, the attachment 20 is locked via the eyes 316 and latching elements 314. The latching projections 314 are disposed in the view in planar recesses 315 in the interior of the module housing 17.

Figure 7:
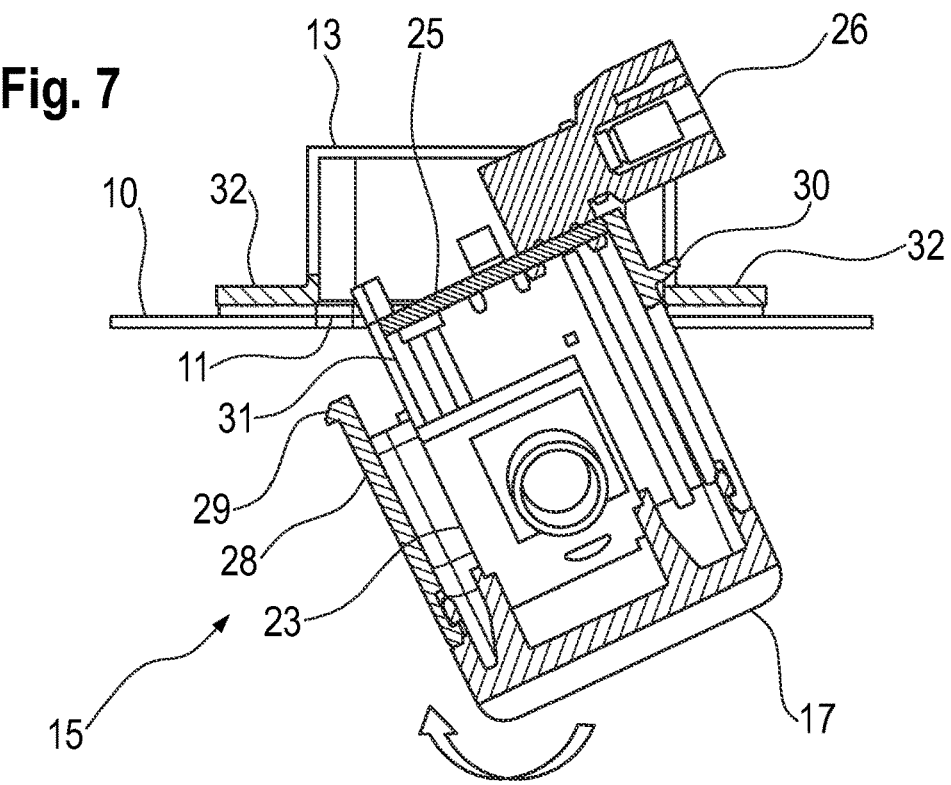
FIG. 7 is a side-sectional view of the first camera module in an oblique position adopted for assembly.

FIG. 7 shows as a sectional drawing in side view the first camera module 15 in an oblique position adopted for assembly on the intermediate wall 38, relative to the normal vector of the recess 11. The module housing 17 has been placed or positioned on the bearing edge 32 of the backing piece 13 with its laterally protruding projections 30 on the rear-side or rear edge 27.

Figure 8:
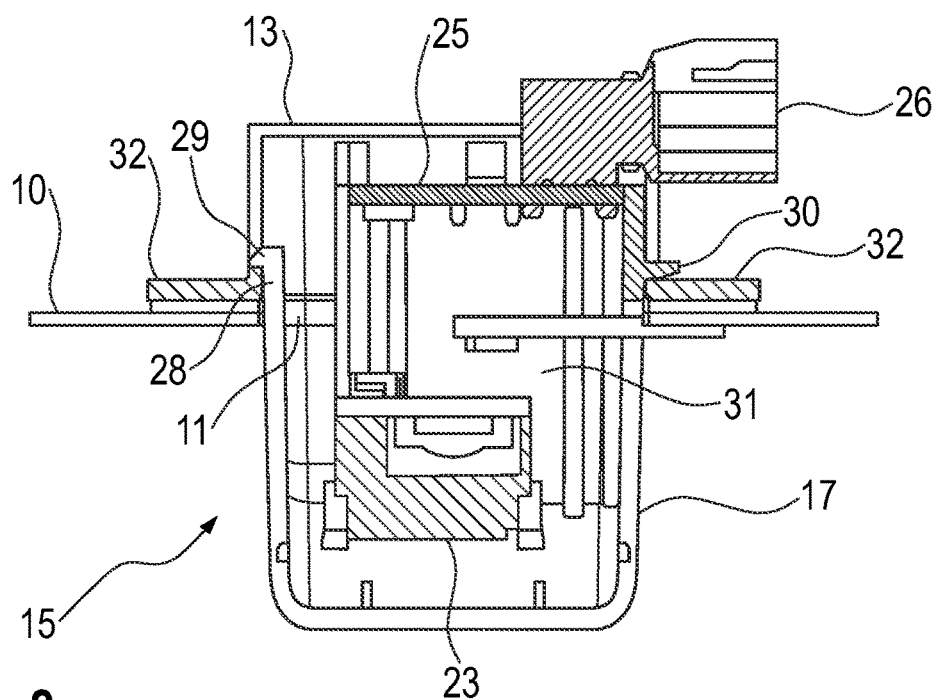
FIG. 8 is a side-sectional view of the first camera module in its assembled state.

FIG. 8 shows as a sectional drawing in side view the first camera module 15 in its assembled state. The module housing 17 starting from the oblique position shown in FIG. 7 has been pivoted about the bearing points of the projections 30 with the bearing edge 32, i.e. clockwise in the view shown, as indicated by the curved arrow illustrated in FIG. 7. The snap lug 29 is latched behind the bearing edge 32. The housing 17 achieves a fixed position via the lugs attached to the fastening structure 31, and the backing piece 13 serves as a stop here.

Figure 9:
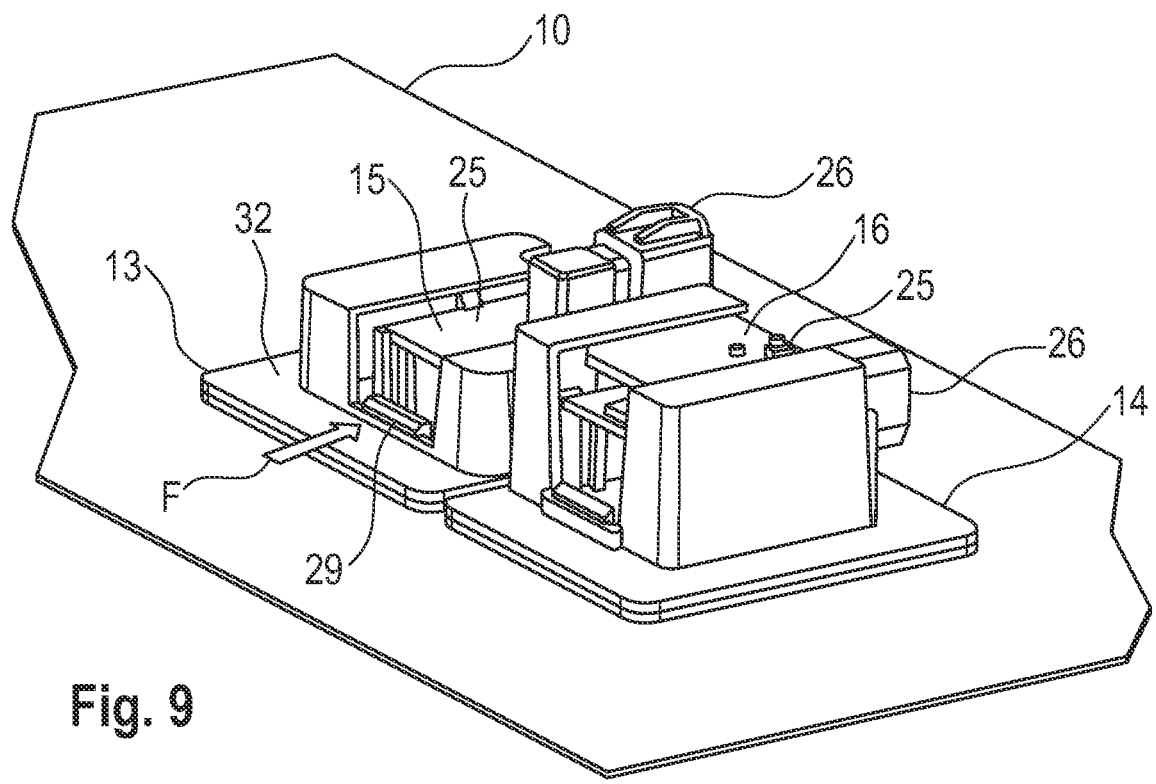
FIG. 9 is a perspective view from above of a detail of the intermediate wall of the ceiling of the storage compartment of the refrigerator of FIG. 2 with two backing pieces and assembled camera modules.

FIG. 9 shows in a perspective view from above a detail of the intermediate wall 38 of the storage compartment ceiling 10 with the two backing pieces 13 and 14 and camera modules 15 or 16 received therein by assembly. The arrangement of the first camera module 15 corresponds to the arrangement shown in FIG. 8. The snap lugs 29 of both camera modules 15, 16 are exposed.

As soon as the camera modules 15, 16 are fully installed as shown, suitable cables (not illustrated) can be inserted in the exposed cable plug connectors 26, here: a coaxial cable plug connector, in order to connect the camera modules 15, 16 to a central control device of the refrigerator K. The cable plug connectors 26 are configured here, for example, as HFM ("high speed FAKRA mini") plug connectors, in particular bushes. The cable plug connectors 26 of the camera modules 15, 16 can have a variable coding in order to prevent confusion of the cables to be inserted. The cables to be inserted can also be variable in terms of length and/or differ in terms of color, also in order to prevent incorrect insertion.

Figure 10:
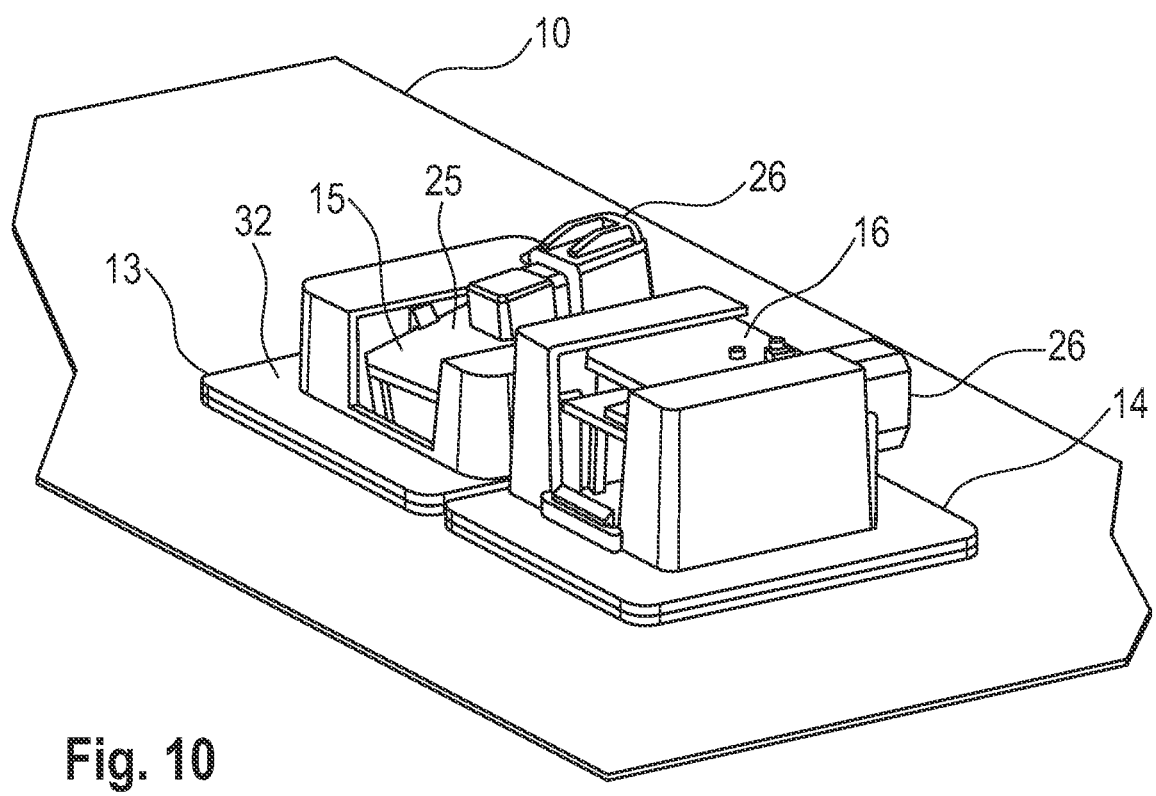
FIG. 10 is a perspective view from above of a detail of the intermediate wall of the ceiling of the storage compartment of the refrigerator of FIG. 2 with two backing pieces and a first camera module partially installed or uninstalled.

As indicated by way of example for the first camera module 15, if a force F is exerted on the snap lug 29 in the direction of the recess 11, the latching hook 28 bends until it comes out of engagement from the backing piece 13. As a result, the first camera module 15 can be rotated out of the recess 11 in a reverse direction to the insertion, as shown in FIG. 10 and also in FIG. 7, and then removed. No screw connections or the like have to be released therefor.

The second camera module 16 is removable in a similar manner by pushing in, and thereby unlatching, the snap lug 29 and subsequently pivoting.

It is also possible to release the first camera module 15 from the side of the storage compartment 3 by the two sides of the module housing 17, from which the snap lug 29 and the projections 30 originate, being compressed, which corresponds in FIG. 8 to compressing the left-hand and right-hand sides of the module housing 17 shown.

Figure 11:
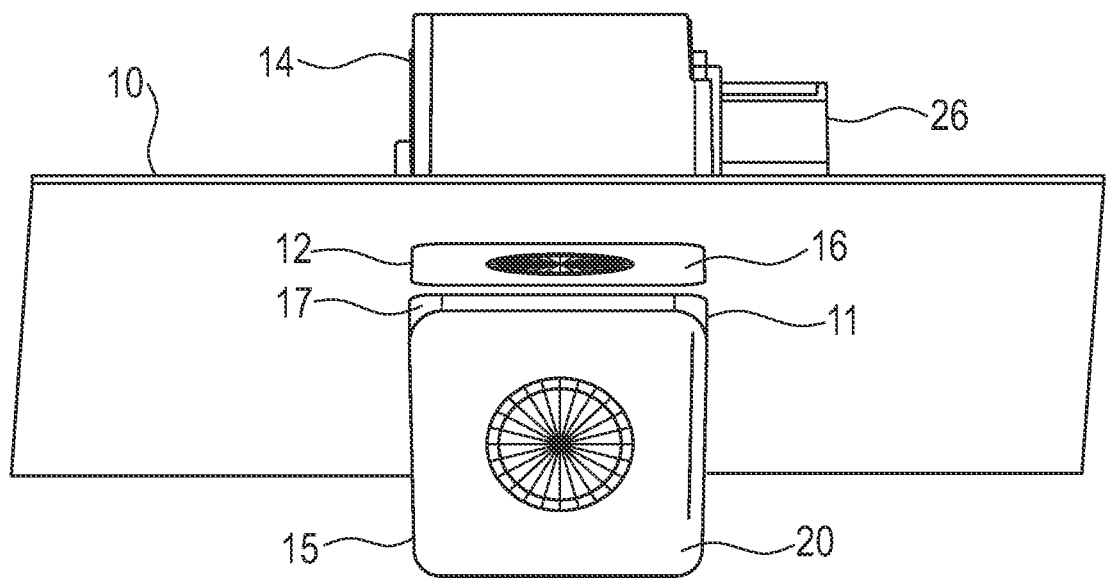
FIG. 11 is a perspective view from below of a detail of the intermediate wall of the ceiling of the storage compartment of the refrigerator of FIG. 2 with two assembled camera modules.

FIG. 11 shows in a perspective view from below and from the front (for example when viewing into the loading opening 2) a detail of the intermediate wall 38 of the ceiling 10 of the storage compartment 3 of the refrigerator K with the assembled first camera module 15 and the assembled second camera module 16. The camera of the first camera module 15 is oriented in the direction of the loading opening 2 while the camera of the second camera module 16 is oriented downwardly in the direction of an open drawer 53 of the storage compartment 3, for example a VitaFresh drawer. In contrast to the first camera module 15, the second camera module 16 in the assembled state does not protrude into the storage compartment 3 but is inserted into the recess 12 approximately flush-mounted with the intermediate wall 38.

Figure 12:
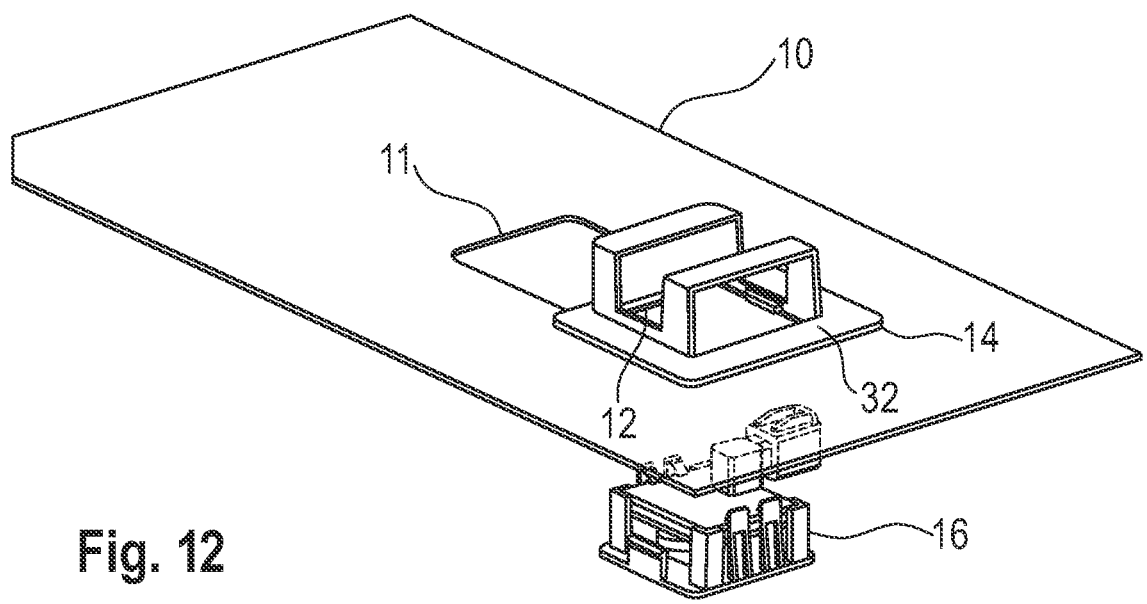
FIG. 12 is a perspective view similar to FIG. 4 of a detail of the intermediate wall of the ceiling of the storage compartment with a second camera module and the backing piece thereof.

FIG. 12 shows in a view similar to FIG. 4, in a perspective view from above, a detail of the intermediate wall 38 with the second camera module 16 and the backing piece 14 thereof positioned on the rear face of the intermediate wall 38, but without the first camera module 15 and without the backing piece 13 thereof.

Figure 13:
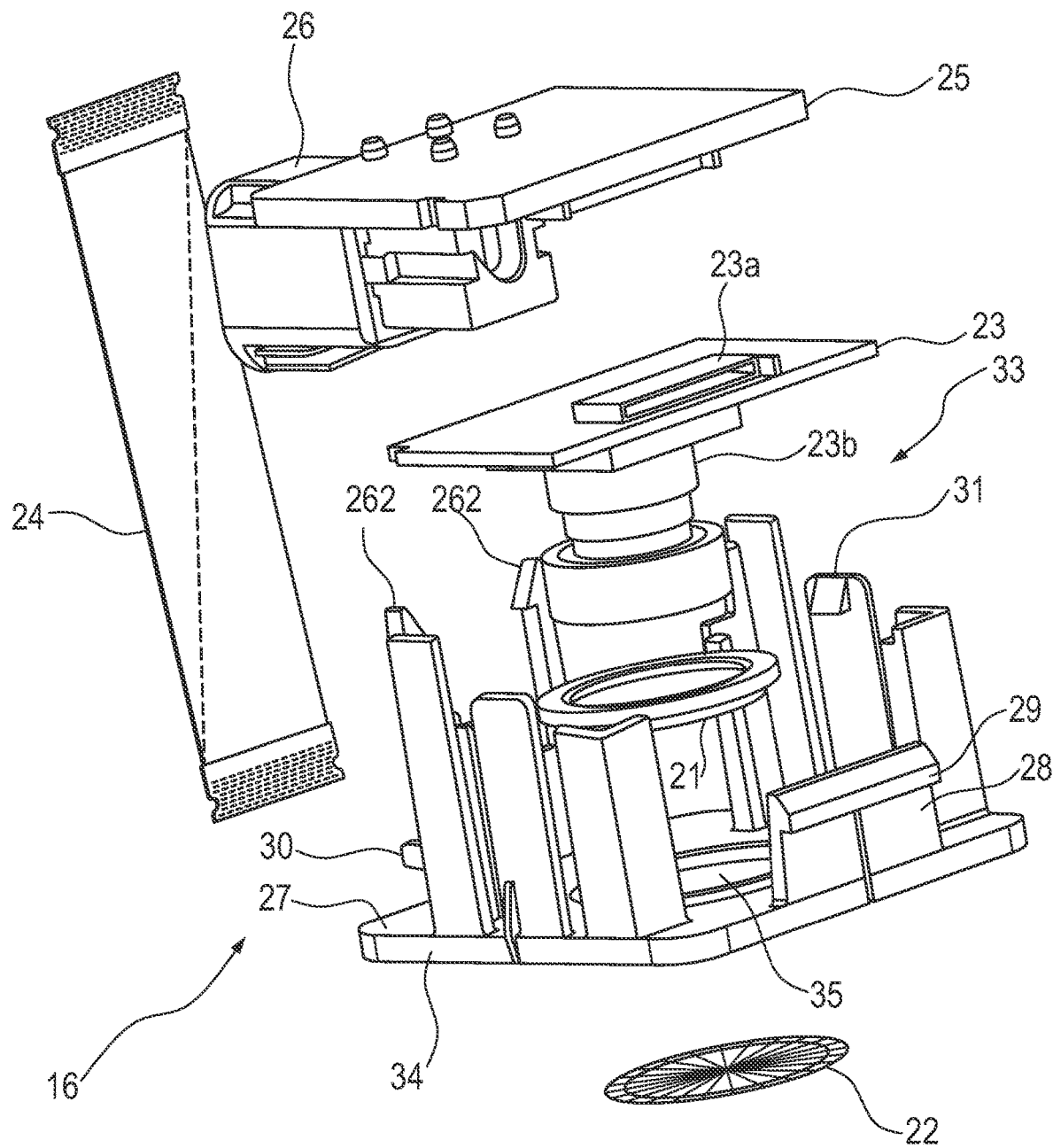
FIG. 13 is a perspective view similar to FIG. 5 of the second camera module in an exploded view.

FIG. 13 shows in a view similar to FIG. 5 the second camera module 16 in an exploded view. The second camera module 16 is provided to record images from above of an open drawer 53 of the storage compartment 3, for example a VitaFresh drawer.

The module housing 33 has a bottom plate 34 which covers the recess 12 and which has a hole 35 for embedding the light guide element 21. Alternatively, the module housing 33 and the light guide element 21 are manufactured in one piece by using a two-component injection-molding method.

In principle, similar to the camera module 16, a latching hook 28 with a snap lug 29 protruding outwardly to the side stands vertically from a rear edge 27 of the module housing 33. A projection 30 protruding to the side in the opposing direction relative to the latching hook 28 is located on the opposing edge portion. While the edge 27 can be inserted in a well-fitting manner into the recess 11, the snap lug 29 and the projections 30 with the module housing 17 inserted therein can protrude over the recess 12 to the side and engage therebehind. A fastening structure (not illustrated) on which the communication or connecting printed circuit board 25 can also be fastened, in particular latched, protrudes to the rear from the bottom plate 34.

The camera module 16 can also be assembled without the use of tools. It is assumed that the camera printed circuit board 17 is already fully connected via the flexible conductor film 25 to the communication or connecting printed circuit board 26. Initially the camera printed circuit board 17 is latched in the housing 33 and then the communication or connecting printed circuit board 26 is also latched to the housing 33.

Figure 14:
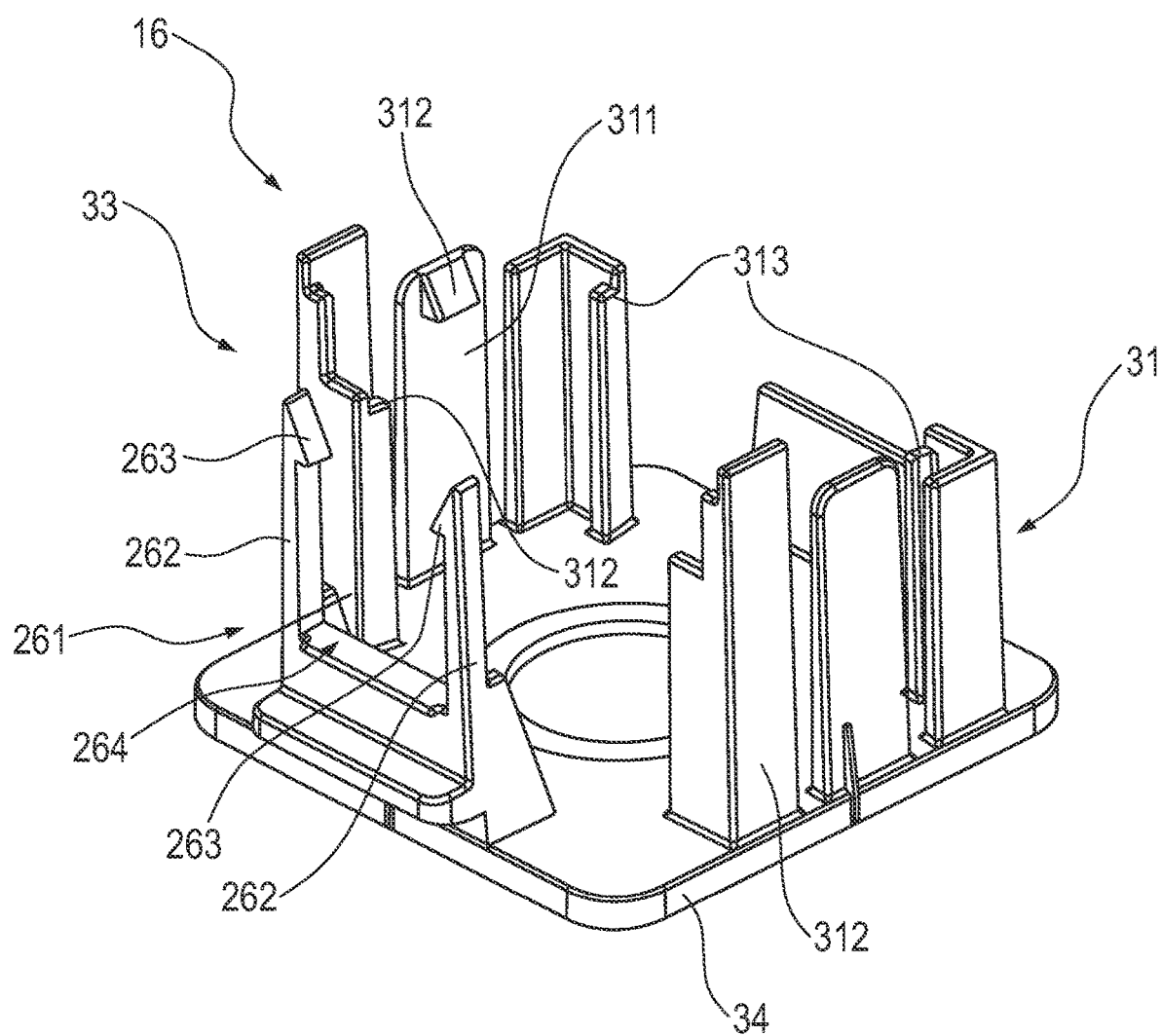
FIG. 14 is a perspective view from above of a camera housing of the second camera module.

FIG. 14 shows in a perspective view from above the module housing 33 of the second camera module 16. In principle, similar to the first camera module 15, the module housing 33 of the second camera module 16 has a fastening structure 31 with holding arms 311 protruding to the rear from a bottom plate 34, and with latching lugs 312 inwardly protruding to the side at the free ends, and lower abutments 313 for locking the camera printed circuit board 17 (see FIG. 13). In contrast to the first camera module 15, the module housing 33 of the second camera module 16 has a clamp 261 with two fork-shaped clamping arms 262 for fastening the cable plug connector 26 (see FIG. 13). The clamping arms 262 enclose a plug socket 264 in which the cable plug connector 26 is held in the assembled state. Holding lugs 263 which protrude to the side in the direction of the plug socket 264 and which hold the cable plug connector 26 in the assembled state in the plug socket 264 are located in each case at the free ends of the clamping arms 262. The communication printed circuit board 25 is locked in the module housing 33 and held in position in the embodiment only by the clamp 261 which encompasses with the clamping arms 262 the cable plug connector 26 of the communication printed circuit board 25.

Figure 15:
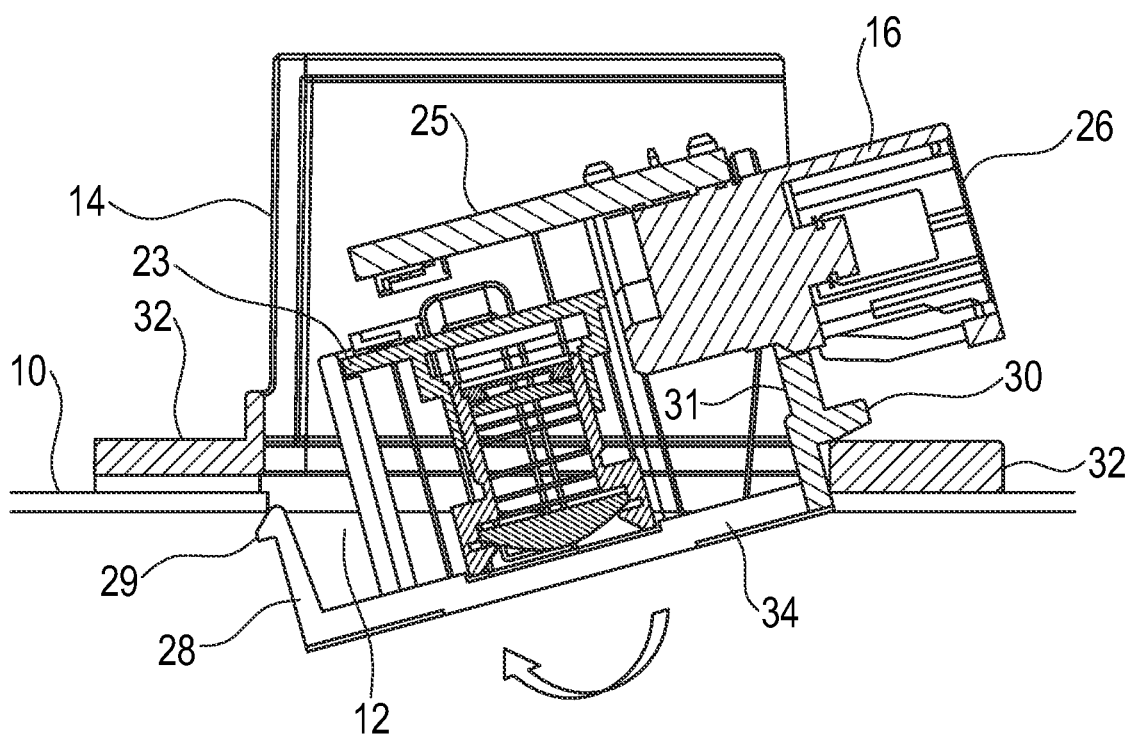
FIG. 15 is a side-sectional view of the second camera module in an oblique position adopted for assembly.

FIG. 15 shows as a sectional drawing in side view the second camera module 16 in an oblique position adopted for assembly, similar to the oblique position of the first camera module 15 shown in FIG. 7. The projection 30 is positioned on the bearing edge 32 of the backing piece 14 which thus serves as a bearing. By subsequent rotation of the second camera module 16, as indicated by the curved arrow, the latching hook 28 penetrates into the recess 12 and is latched onto the portion of the bearing edge 32 of the backing piece 14 opposing the projection 30. The backing piece 14 can also serve here as a stop for the second camera module 16.

Figure 16:
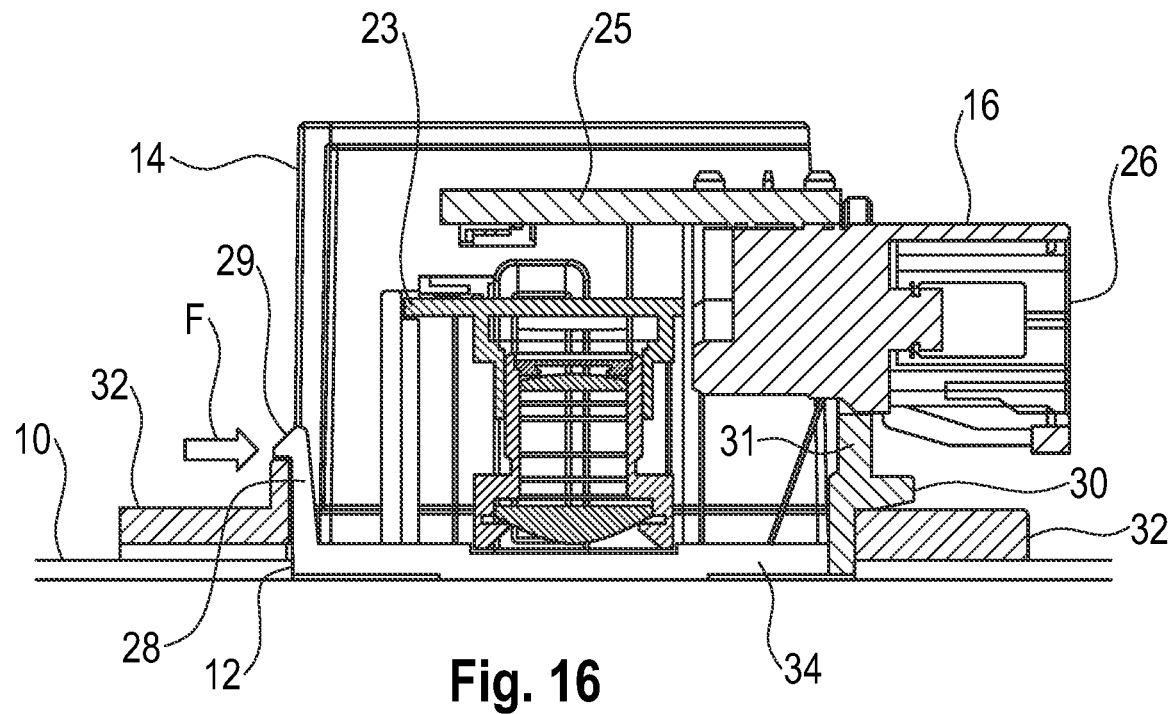
FIG. 16 is a side-sectional view of the second camera module in its assembled state.

FIG. 16 shows as a sectional drawing in side view the second camera module 16 in its assembled state in which the latching hook 28 is latched to the backing piece 14. Similar to the first camera module 15, by applying a force F onto the snap lug 29, in such a way that this is pushed in the direction of the recess 12, the latching hook 28 can be brought out of engagement with the backing piece 14, whereby the second camera module 16 can be removed again by pivoting in the opposite direction to installation.

Figure 17:
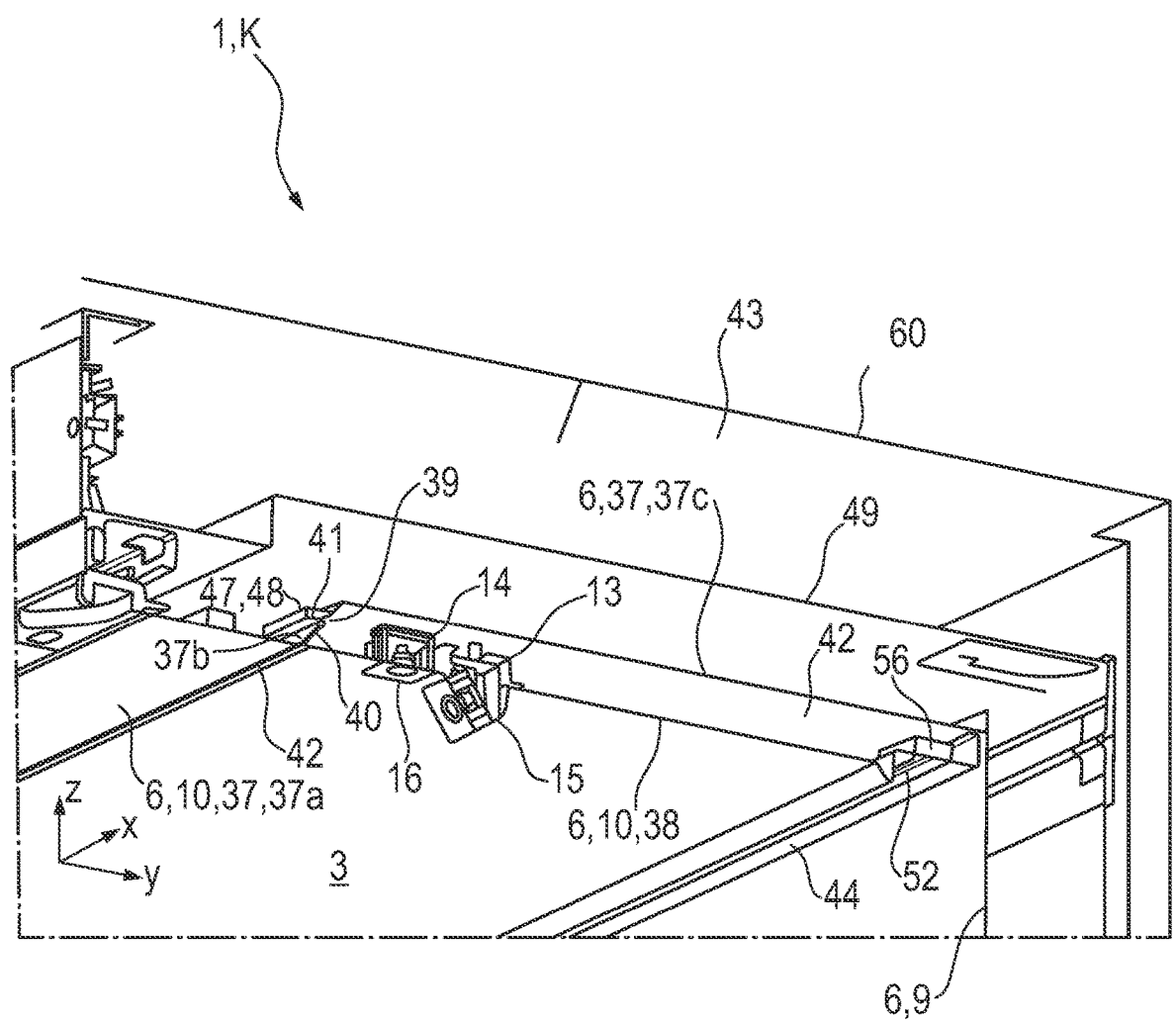
FIG. 17 is a side-perspective view of a detail of the camera module of the refrigerator of FIG. 1.

FIG. 17 shows a side view of a detail of the refrigerator K as a sectional drawing with a vertical cutting plane through the camera modules 15 and 16. The storage compartment ceiling 10 has a front portion which is formed by a front partial region 37a of a ("container") ceiling 37 of the internal container 6-9, 37. The storage compartment ceiling 10 has behind the front portion a rear portion which is formed by an intermediate wall 38. The partial region 37a of the container ceiling 37 located in front of the intermediate wall 38 is disposed flush-mounted with the intermediate wall 38, and transitions via an oblique step 37b inclined to the rear (in a front view) into a higher rear partial region 37c (see FIG. 17). The rear partial region 37c is located, as a result, above the intermediate wall 38.

The step 37b has along its width extent by way of example five recesses 39 in which tabs 41 engage, the tabs being shaped from a front-side or front edge 40 of the intermediate wall 38 and being bent back to the front (see FIG. 17). The rear partial region 37c of the container ceiling 37 is disposed above the intermediate wall 38 and spaced apart therefrom. This can be expressed in such a way that the intermediate wall 38 on the storage compartment side is disposed spaced apart from the rear partial region 37c of the container ceiling 37. An intermediate space 42, in which for example the backing pieces 13 and 14 are located, is present between the container ceiling 37 or the rear partial region 37c thereof and the intermediate wall 38. The intermediate space 42 is, in particular, filled with air, while an intermediate space 43 between the container ceiling 37 and an external housing 49 of the refrigerator K is filled at least partially with thermally insulating material (not illustrated), for example insulating foam. A free intermediate space 43 is also present between surrounding furniture 60 and the external housing 49. The surrounding furniture 60 can be furniture panels which conceal the refrigerator K in the built-in state.

Figure 19:
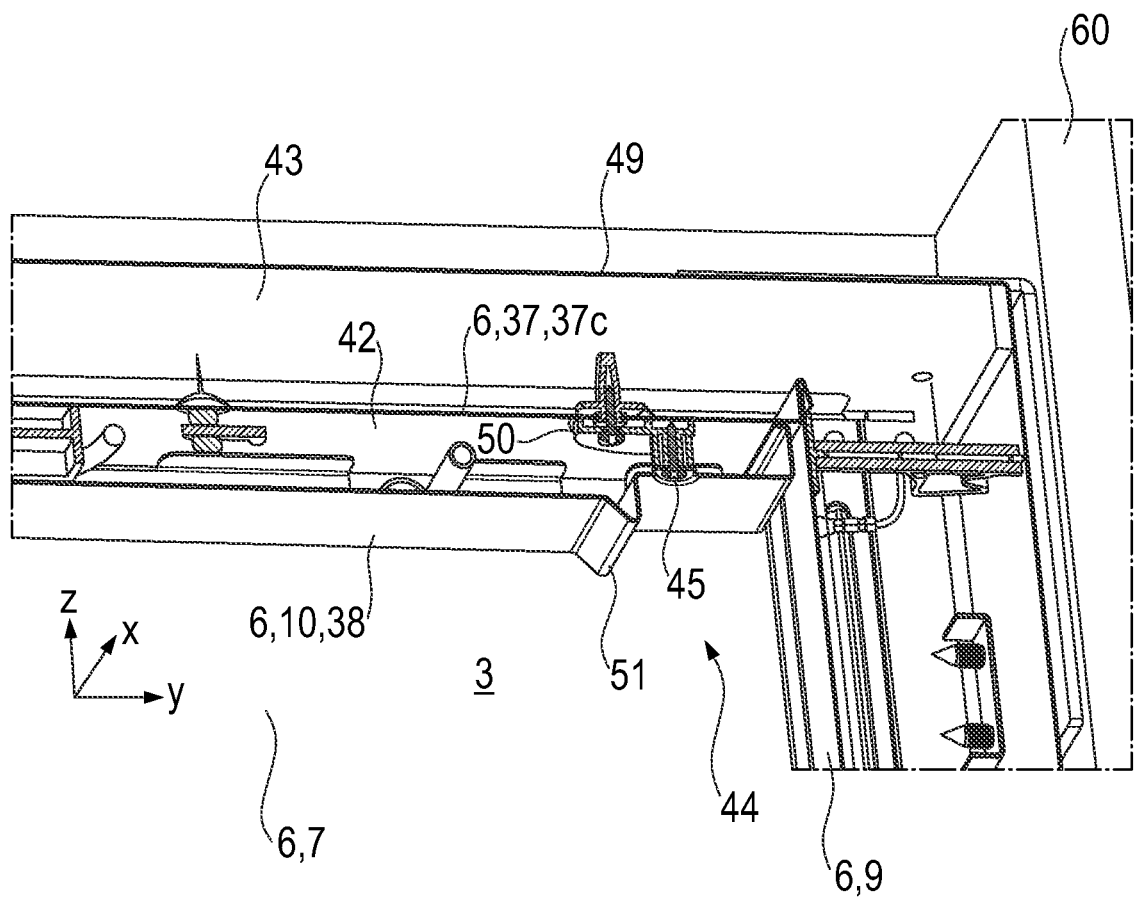
FIG. 19 is a perspective and sectional view of an enlarged detail of the storage compartment ceiling in the region of a rear edge.

The intermediate wall 38 is pivotable about its front edge 40 into the storage compartment 3, in particular after releasing at least one releasable fixing device located in the region of a rear edge 44 (for example the screw 45 shown in FIG. 19). The released rear edge 44 drops down and the intermediate wall 38 pivots or rotates together with the camera modules 15, 16 and the backing pieces 13, 14 about the front edge 40 into the storage compartment 3, specifically by rotating the tabs 41 located on the front edge 40 into the recesses 39 of the step 37b. The tabs 41 can be pulled out or unhooked from the recesses 39 at the same time or subsequently, or automatically brought out of engagement due to the rotation. As a result, the intermediate wall 38 is removable, whereby its rear face is easily accessible. In particular, the camera modules 15, 16 can be particularly easily accessible, which considerably facilitates the attachment and replacement of the camera modules 15, 16.

Figure 18:
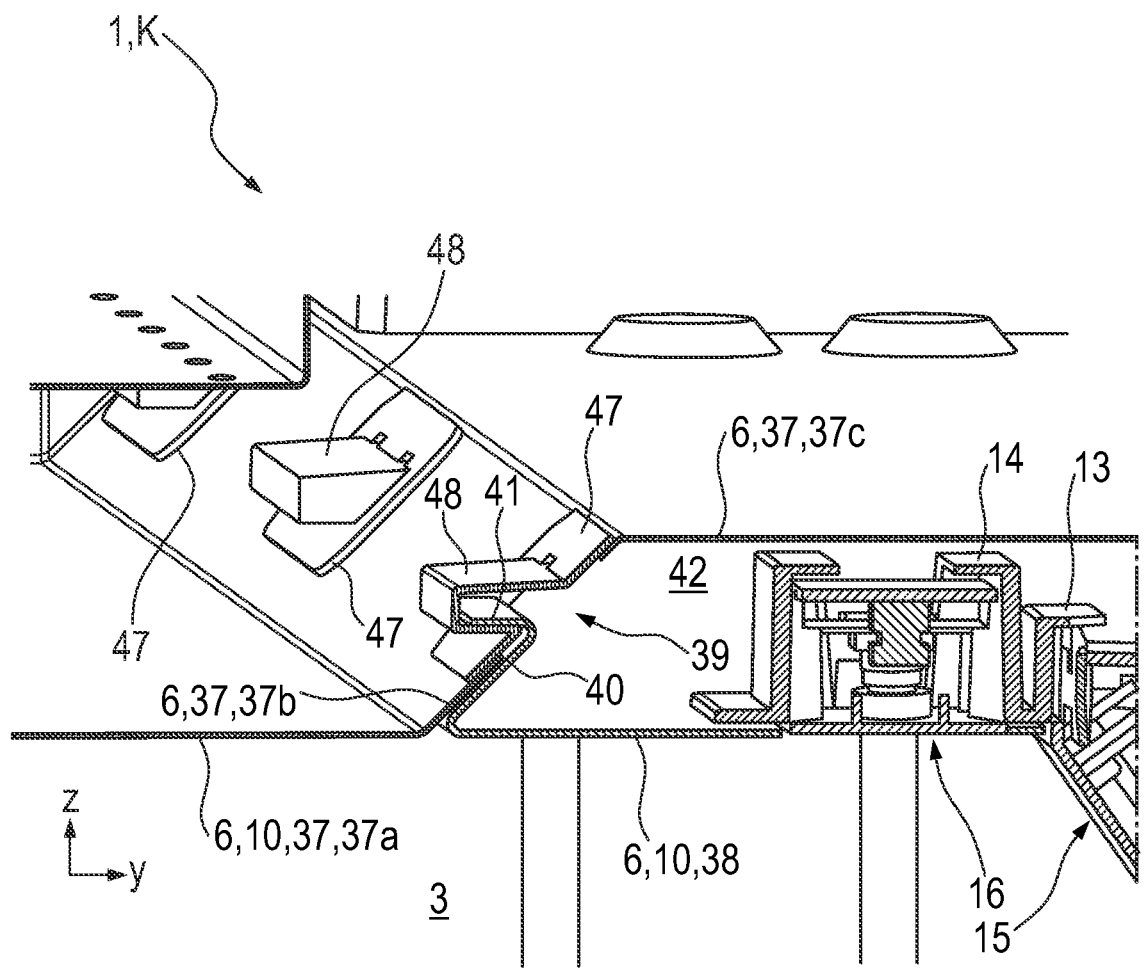
FIG. 18 is a perspective and sectional view of an enlarged detail of the storage compartment ceiling in the region of a front edge.

FIG. 18 shows as a sectional drawing through a tab 41, in an oblique view, an enlarged detail of the storage compartment ceiling 10 in the region of the front edge 40. The front edge 40 of the intermediate wall 38 is an oblique bent-up edge (in front view) from which the tabs 41 are bent out to the front. The front edge 40 has the same inclination as the step 37b and thus is configured in accordance therewith.

In the present case, the tabs 41 are not inserted directly into the respective recesses 39 but are hooked into an adapter piece 47 which covers the respective recess 39 on the side of the step 37b facing away from the storage compartment. The adapter piece 47 can be inserted into the recess 39, latched and/or bonded to the step 37b. The adapter piece 47 has a protrusion 48 into which the tab 41 can engage, or engages in the assembled state.

FIG. 19 shows as a sectional drawing through the screw 45, in an oblique view, an enlarged detail of the storage compartment ceiling 10 in the region of the rear edge 44 in the vicinity of the left-hand side wall 7. The screw 45 is screwed into a screw hole adapter 50 which is screwed onto the rear partial region 37c of the container ceiling 37. As a result, the intermediate wall 38 is indirectly fastened by the releasable screw 45 to the container ceiling 37. The screw hole adapter 50 can be configured in such a way that it additionally serves as a spacer between the intermediate wall 38 and the container ceiling 37. Similarly, the intermediate wall 38 can also be fastened at different points to the container ceiling 37, for example in the vicinity of the right-hand side wall 8.

A projection 51 protruding in the direction of the storage compartment 3 is present in the region of the rear edge 44 in front of the screws 45, in the intermediate wall 38, for example by bending sheet metal. This projection 51 conceals the screw 45 from a typical view through the loading opening 2.

Returning again to FIG. 17, the intermediate wall 38 (in a front view) has a recess 52 extending transversely (in a front view from left to right) behind the projection 51. This recess can be used in order to provide one or more light sources (not illustrated) for illuminating the storage compartment 3. Due to the projection 51, a direct view of the light source(s) is prevented and thus glare from the light source(s) to a user is avoided.

Figure 20:
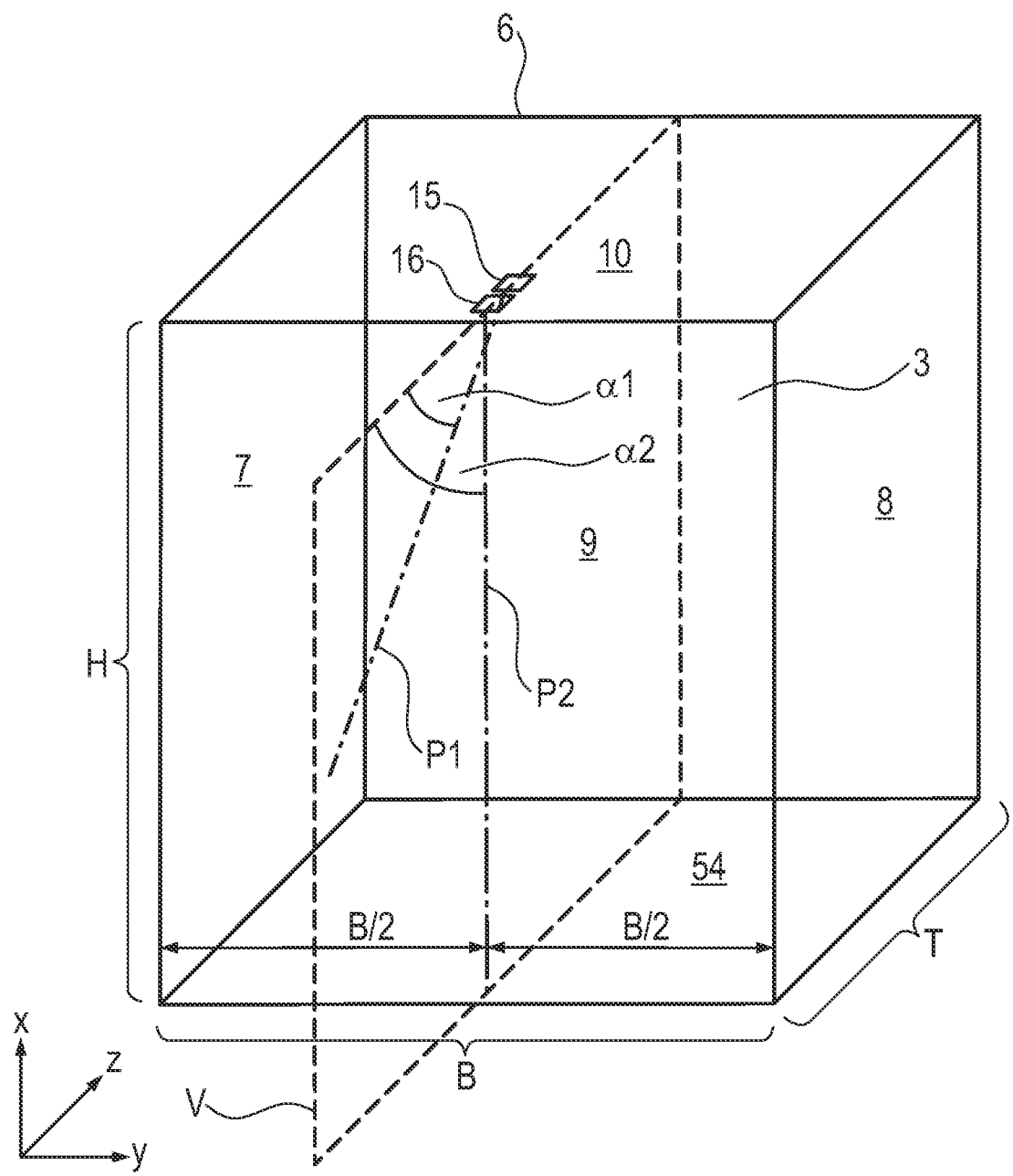
FIG. 20 is a front-perspective view of an internal wall of a refrigerator, with two camera modules being disposed directly one behind the other on the ceiling thereof in a front view.

FIG. 20 shows an illustration of an internal wall of a refrigerator, two camera modules being disposed directly one behind the other on the ceiling 10 thereof, in a front view. This can be the above-described refrigerator K, for example, the illustration being described by way of example with reference thereto.

The internal wall 6 defining the storage compartment 3 has a rectangular basic shape, the left lower corner thereof being regarded as the origin of a Cartesian coordinate system. The height H of the internal wall 6 or the storage compartment 3 is determined along the x-axis, the width B along the y-axis and the depth T along the z-axis. The left-hand side wall 7 is located in the (x; 0; z) plane, the right-hand side wall 8 is located in the (x; B; z) plane, the rear wall 9 is located in the (x; y; T) plane, the ceiling 10 is located in the (H; y; z) plane and the bottom 54 is located in the (0; y; z) plane. The loading opening 2 is located in the (x; y; 0) plane. The front view corresponds to a view in the storage compartment 3 through the loading opening 2 in the direction of the z-axis.

The two camera modules 15 and 16 are disposed directly one behind the other on the ceiling 10 of the internal wall 6, in a front view, which can also be expressed here in such a way that the camera modules are located in a vertical plane V which is perpendicular to the loading opening 2. The camera modules 15 and 16 are also disposed centrally to the storage compartment 3 in a front view, so that the vertical (central) plane V corresponds to the (x; B/2; z) plane.

As shown for example in FIG. 17, the first camera module 15 can be disposed behind the second camera module 16 in a front view and protrude from the ceiling 10 downwardly while the second camera module 16 is incorporated flush-mounted into the ceiling 10.

The optical axes P1 and P2 of the camera modules 15 or 16 or their optical systems 23b can also be located in the vertical central plane V. The optical axis P1 of the first camera module 15 can be at an angle $\alpha 1$ relative to the horizontal (y; a) plane which is less than the angle $\alpha 2$ relative to the horizontal (y; z) plane of the optical axis P2 of the second camera module 16. The optical axis P1 thus runs flatter than the optical axis P2. In particular, the optical axis P2 of the second camera module 16 can be oriented vertically downwardly, which corresponds to an angle $\alpha 2=90°$. Thus the first camera module 15 is particularly suited for recording images of the inner faces of the—in particular also open—doors 4, while the second camera module 15 is particularly suited for recording images from above of both open drawers 53.

Figure 21:
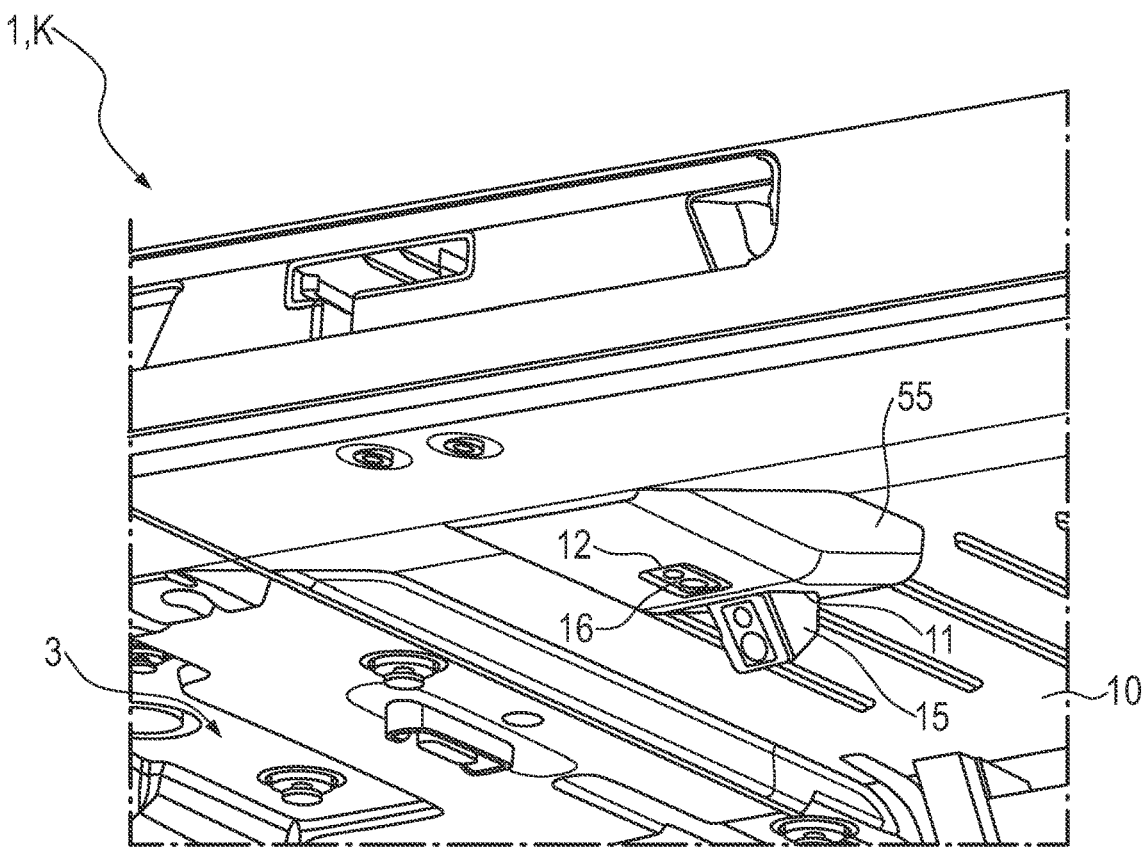
FIG. 21 is a bottom-perspective view of a detail of a storage compartment ceiling according to a further possible exemplary embodiment with an attachment for the camera modules.

FIG. 21 shows in a perspective view from below a detail of a further possible variant of the storage compartment ceiling 10 with a common shell-shaped attachment 55 fastened on the storage compartment side for the camera modules 15 and 16 disposed one behind the other.

Figure 22:
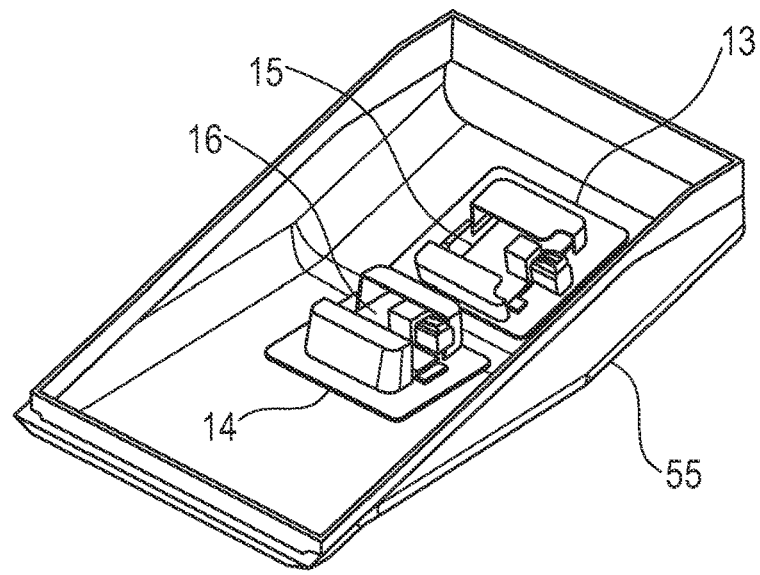
FIG. 22 is a top-perspective view showing the attachment of FIG. 21 with the camera modules disposed thereon.

FIG. 22 shows the attachment 55 with the camera modules 15, 16 disposed thereon in a perspective view from above of its open upper face. The attachment 55 has the recesses 11 and 12 to which the backing pieces 13 or 14 are fastened and through which the camera modules 15 or 16 protrude.

Naturally the present invention is not limited to the exemplary embodiment shown.

Generally "one," etc. can be understood to mean a singular or a plurality, in particular in the sense of "at least one" or "one or more" etc., provided this is not explicitly excluded, for example by the expression "exactly one," etc.

Numerical data can also encompass precisely the specified number and also a conventional tolerance range provided this is not explicitly excluded.

The following is a summary list of reference numerals and the corresponding structure used in the above description of the invention.

LIST OF REFERENCE SIGNS

1 Household appliance
2 Loading opening

3 Storage compartment
4 Door
5 Shelf
6 Internal wall
7 Left-hand side wall
8 Right-hand side wall
9 Rear wall
10 Ceiling of internal wall
11 Recess
12 Recess
13 Backing piece
14 Backing piece
15 First camera module
16 Second camera module
17 Module housing
18 Open front face
19 Open upper face
20 Attachment
21 Light guide element
22 Demisting film
23 Camera printed circuit board
23a Camera sensor
23b Optical system
24 Flexible conductor film
25 Communication printed circuit board
26 Cable plug connector
261 Clamp
262 Clamping arms
263 Holding lug
264 Plug socket
27 Rear edge
28 Latching hook
29 Snap lug
30 Projection
31 Fastening structure
31' Fastening structure
311 Holding arm
311' Holding arm
312 Latching lug
312' Latching lug
313 Abutment
313' Abutment
314 Latching elements
315 Recess
316 Eye
32 Bearing edge
33 Module housing
34 Bottom plate
35 Hole
37 Container ceiling
37a Front partial region of container ceiling
37b Step of container ceiling
37c Rear partial region of container ceiling
38 Intermediate wall
39 Recess in step
40 Front edge of intermediate wall
41 Tab
42 Intermediate space
43 Intermediate space
44 Rear edge of intermediate wall
45 Screw
47 Adapter part
48 Protrusion
49 External housing
50 Screw hole adapter
51 Projection
52 Recess
53 Drawer
54 Bottom of inner wall
55 Attachment
56 Light source
60 Surrounding furniture
B Width of storage compartment
H Height of storage compartment
K Refrigerator
P1 Optical axis
P2 Optical axis
S Refrigerated drawer
T Depth of storage compartment
V Central plane
x x-axis
y y-axis
z z-axis
α1 Angle
α2 Angle

The invention claimed is:

1. A household appliance or refrigerator, comprising:
an internal wall having a ceiling;
a storage compartment defined by said internal wall, said storage compartment having a loading opening;
at least one door configured to close said loading opening; and
at least two camera modules disposed directly one behind another on said ceiling, as seen in a front view onto the household appliance;
said at least two camera modules including first and second camera modules each having an optical axis, and said optical axis of said first camera module enclosing a smaller angle relative to the horizontal than said optical axis of said second camera module;
said optical axis of said second camera module being oriented vertically downwardly; and
said second camera module being incorporated into said ceiling and being parallel to said ceiling, and said first camera module protruding downwardly from said ceiling.

2. The household appliance according to claim 1, wherein said at least two camera modules are located in a vertical plane perpendicular to said loading opening to place said at least two camera modules directly one behind another.

3. The household appliance according to claim 2, wherein said at least two camera modules have said optical axes located in said vertical plane in which said at least two camera modules are disposed.

4. The household appliance according to claim 1, which further comprises:
at least one extendable drawer configured to be accommodated in said storage compartment;
said first camera module having a field of view encompassing said loading opening; and
said second camera module having a field of view encompassing said at least one extendable drawer in an open state.

5. The household appliance according to claim 1, wherein said first camera module is disposed behind said second camera module.

6. The household appliance according to claim 1, wherein said at least two camera modules are disposed centrally relative to said storage compartment, as seen in the front view onto the household appliance.

7. The household appliance according to claim 1, which further comprises:
an internal container having a ceiling;

said ceiling of said internal wall at least in some regions forming an intermediate wall having a side facing said storage compartment, said intermediate wall being spaced apart from said ceiling of said internal container;

said intermediate wall being removable or pivotable into said storage compartment; and said at least two camera modules being disposed on said intermediate wall.

8. The household appliance according to claim 1, wherein said at least two camera modules each have a module housing and a camera sensor attached to said module housing, said module housings each have at least one latching element, and said module housings are disposed on said ceiling of said internal wall by a snap connection using said at least one latching element.

9. A household appliance or refrigerator, comprising:
an internal wall having a ceiling;
a storage compartment defined by said internal wall, said storage compartment having a loading opening;
at least one door configured to close said loading opening;
at least one functional unit disposed on said ceiling of said internal wall;
an internal container having a ceiling;
said ceiling of said internal wall at least in some regions forming an intermediate wall having a side facing said storage compartment, said intermediate wall being spaced apart from said ceiling of said internal container; and
said intermediate wall being removable,
said intermediate wall having a front edge, and said intermediate wall being pivotable into said storage compartment or being pivotable about said front edge into said storage compartment;
said intermediate wall and said ceiling of said internal container forming one respective partial region of said ceiling of said internal wall;
said ceiling of said internal container being disposed in front of said front edge of said intermediate wall; and
said intermediate wall having at least one tab on said front edge and said intermediate wall being configured to be fastened on said front edge to said ceiling of said internal container by using said at least one tab.

10. The household appliance according to claim 9, wherein said at least one functional unit is disposed on said intermediate wall.

11. The household appliance according to claim 10, wherein said intermediate wall has a rear edge and at least one releasable fastening element on said rear edge for fastening said intermediate wall.

12. The household appliance according to claim 11, wherein said ceiling of said internal container extends over an oblique step from a partial region disposed above said intermediate wall to a partial region disposed in front of said intermediate wall, and at least one recess is formed in said oblique step for receiving said at least one tab of said front edge of said intermediate wall.

13. The household appliance according to claim 9, wherein said ceiling of said internal container has an oblique step with a shape, said front edge of said intermediate wall is an oblique bent-up edge from which said at least one tab is bent out, and said front edge is shaped according to said shape of said oblique step.

14. The household appliance according to claim 9, wherein said ceiling of said internal container has an oblique step with a side facing away from said storage compartment, adapter pieces are each positioned over a respective recess on said side of said oblique step facing away from said storage compartment, and said at least one tab includes a plurality of tabs each inserted into a respective one of said adapter pieces.

15. The household appliance according to claim 9, wherein said intermediate wall has a rear edge, and at least one releasable fastening element is configured to fasten said rear edge of said intermediate wall to said ceiling of said internal container.

16. The household appliance according to claim 15, wherein said at least one releasable fastening element is a screw, a screw hole adapter providing a screw hole for said at least one releasable screw is attached to said ceiling of said internal container, protruding in a direction of said intermediate wall, and said screw hole adapter is configured as a spacer between said intermediate wall and said ceiling of said internal container.

17. The household appliance according to claim 16, wherein said intermediate wall has a projection protruding in a direction of said storage compartment in a region of said rear edge in front of a position provided for said at least one releasable fastening element.

18. The household appliance according to claim 17, wherein said at least one functional unit is disposed on said intermediate wall, and said at least one functional unit is at least one light source attached behind said projection.

19. The household appliance according to claim 9, wherein said at least one functional unit is disposed on said intermediate wall, and said at least one functional unit is a camera module.

20. The household appliance according to claim 19, wherein said at least one camera module has a module housing and a camera sensor disposed on said module housing, said module housing has at least one latching element, and said module housing is disposed on said intermediate wall by using said at least one latching element.

21. A household appliance or household refrigerator, comprising:
an internal wall;
a storage compartment defined by said internal wall, said storage compartment having a loading opening;
at least one door configured to close said loading opening;
at least one camera module disposed on said internal wall;
said at least one camera module having a module housing and a camera sensor located on said module housing; and
said module housing having at least one snap element locking said module housing on said internal wall;
said module housing having a rear face with at least one laterally protruding projection and an opposing point with at least one flexible snap hook with a snap lug protruding in a direction opposite to said at least one laterally protruding projection.

22. The household appliance according to claim 21, wherein said module housing is latched to said internal wall.

23. The household appliance according to claim 21, wherein said internal wall has a side facing away from said storage compartment, a backing piece is disposed on said side of said internal wall, and said module housing is latched to said backing piece.

24. The household appliance according to claim 23, wherein said snap lug is accessible from a side of the household appliance for non-destructive unlocking.

25. The household appliance according to claim 21, wherein said module housing protrudes into said storage compartment, said snap hook represents an extension of said module housing on a side facing away from said storage compartment, and said module housing is compressible on a region protruding into said storage compartment to permit said snap hook to be moved sufficiently far to be unlocked.

26. The household appliance according to claim 21, wherein said internal wall has a ceiling, and said at least one camera module is disposed on said ceiling of said internal wall.

27. The household appliance according to claim 26, wherein:
   said at least one camera module includes:
      a first camera module protruding into said storage compartment, said camera sensor of said first camera module having an optical axis oriented obliquely toward a front of the household appliance, and
      a second camera module terminating at least approximately flush-mounted with said ceiling of said internal wall, said camera sensor of said second camera module having an at least approximately downwardly oriented optical axis; and
   said first and second camera modules are disposed on said ceiling of said internal wall.

28. The household appliance according to claim 26, which further comprises an internal container having a ceiling, said ceiling of said internal wall at least in some regions forming an intermediate wall having a side facing said storage compartment, said intermediate wall being spaced apart from said ceiling of said internal container, and said intermediate wall being a movable intermediate wall.

29. The household appliance according to claim 27, wherein said intermediate wall is pivotable into said storage compartment.

30. The household appliance according to claim 21, which further comprises a camera printed circuit board with a camera sensor and a communication printed circuit board with a cable plug connector being disposed one above another in said module housing.

31. The household appliance according to claim 30, which further comprises a flexible conductor film for data and signal transmission and power supply, said flexible conductor film connecting said communication printed circuit board to said camera printed circuit board.

32. The household appliance according to claim 30, wherein said module housing has an attachment and is configured in multiple pieces, said communication printed circuit board is held by a first fastening structure on said module housing, and said camera printed circuit board is held by a second fastening structure on an attachment of said module housing.

33. The household appliance according to claim 30, wherein said module housing has a bottom plate and is configured in one piece, said camera printed circuit board is held by a fastening structure protruding from said bottom plate of said module housing, and said communication printed circuit board is held by a clamp for said cable plug connector on said module housing.

* * * * *